US010656795B1

(12) United States Patent
Pandian et al.

(10) Patent No.: US 10,656,795 B1
(45) Date of Patent: May 19, 2020

(54) PRESENTING, AT A GRAPHICAL USER INTERFACE (GUI), A CONSTELLATION VIEW OF COMMUNICATIONS ASSOCIATED WITH NODE GROUPS IN A NETWORK

(71) Applicant: Ordr Inc., Santa Clara, CA (US)

(72) Inventors: Gnanaprakasam Pandian, Cupertino, CA (US); Vivekanandan Vinayagam, San Ramon, CA (US); Sheausong Yang, Saratoga, CA (US); Vijayaraghavan Doraiswami, Santa Clara, CA (US); Krishna Kumar Vavilala, Bangalore (IN)

(73) Assignee: Ordr Inc., Santa Clara, CA (US)

( * ) Notice: Subject to any disclaimer, the term of this patent is extended or adjusted under 35 U.S.C. 154(b) by 0 days.

(21) Appl. No.: 16/241,489

(22) Filed: Jan. 7, 2019

(51) Int. Cl.
*G06F 3/0482* (2013.01)
*H04L 29/08* (2006.01)
*H04L 12/24* (2006.01)
*G06F 3/0481* (2013.01)

(52) U.S. Cl.
CPC ........ *G06F 3/0482* (2013.01); *G06F 3/04817* (2013.01); *H04L 41/22* (2013.01); *H04L 67/36* (2013.01)

(58) Field of Classification Search
CPC .... G06F 3/0482; G06F 3/04817; G06F 3/048; H04L 41/22; H04L 67/36
See application file for complete search history.

(56) References Cited

U.S. PATENT DOCUMENTS

| 5,926,180 A | * | 7/1999 | Shimamura | G06F 16/954 715/739 |
| 6,850,486 B2 | * | 2/2005 | Saleh | H04J 14/0295 370/218 |
| 8,185,824 B1 | * | 5/2012 | Mitchell | G06F 3/0481 715/734 |
| 8,332,782 B1 | * | 12/2012 | Chang | H04L 12/6418 707/794 |
| 2006/0052998 A1 | * | 3/2006 | Michelman | G06N 3/004 703/22 |
| 2016/0337204 A1 | * | 11/2016 | Dubey | H04L 41/22 |
| 2018/0121032 A1 | * | 5/2018 | Naous | G06F 3/0482 |
| 2018/0182137 A1 | * | 6/2018 | Pushpoth | G06T 11/206 |
| 2018/0234310 A1 | * | 8/2018 | Ingalls | H04L 43/12 |
| 2019/0319926 A1 | * | 10/2019 | Cummins | H04L 41/02 |

* cited by examiner

*Primary Examiner* — Jeanette J Parker
(74) *Attorney, Agent, or Firm* — Invoke

(57) ABSTRACT

Techniques for presenting, at a graphical user interface (GUI), a constellation view of communications associated with node groups of a network disclosed. A GUI presents icons arranged on concentric rings. Icons on one ring represent device groups. Icons on another ring represent address groups. Icons on another ring represent intranet groups. Each icon is selectable to request information about the communications of the corresponding node group. Connections are drawn between the selected icon and other icons to represent the communications. Each connection is selectable to request additional information regarding the communication.

20 Claims, 17 Drawing Sheets

PRESENTING, AT A GRAPHICAL USER INTERFACE (GUI), A CONSTELLATION VIEW OF COMMUNICATIONS ASSOCIATED WITH NODE GROUPS IN A NETWORK

RELATED APPLICATIONS; INCORPORATION BY REFERENCE

This application is related to U.S. Non-Provisional patent application Ser. No. 16/117,897, filed Aug. 30, 2018, and U.S. Non-Provisional patent application Ser. No. 16/118,334, filed Aug. 30, 2018, each of which is hereby incorporated by reference.

The Applicant hereby rescinds any disclaimer of claim scope in any related application(s) or the prosecution history thereof and advises the USPTO that the claims in this application may be broader than any claim in the related application(s).

TECHNICAL FIELD

The present disclosure relates to communications in a network. In particular, the present disclosure relates to presenting, at a graphical user interface (GUI), a constellation view of communications associated with node groups of a network.

BACKGROUND

The term "Internet of Things" (IoT) refers to a network of a wide variety of devices, such as computers, sensors, vehicles, home appliances, medical equipment, and/or surveillance equipment. Such devices may be referred to as "IoT devices." Many IoT devices may connect to a network without explicit permission or acknowledgement from a network administrator. Many IoT devices may be easily relocated from one physical location to another physical location without explicit permission or acknowledgement from a network administrator. Many IoT devices may be easily relocated from one network location to another network location (for example, from one subnet to another subnet) without explicit permission or acknowledgement from a network administrator. Therefore, management of IoT devices (or any network with a large number devices) may be very difficult.

Moreover, an IoT device may be the subject of a network attack. As an example, a user may bring in a particular IoT device to a network. A network administrator might have no knowledge or control over the particular IoT device. The user might not perform regular software updates on the particular IoT device. Hence, the particular IoT device may have vulnerabilities to certain network attacks. The particular IoT device may become a weak entry point for an attacker. As another example, malicious software may be installed on a particular IoT device. Through a network connecting the particular IoT device with other devices, the particular IoT device may cause the malicious software to be installed on the other devices as well. Hence, a large number of devices in the network may become infected. Therefore, maintaining security in a network of IoT devices (or any network with a large number of devices) may be very difficult.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
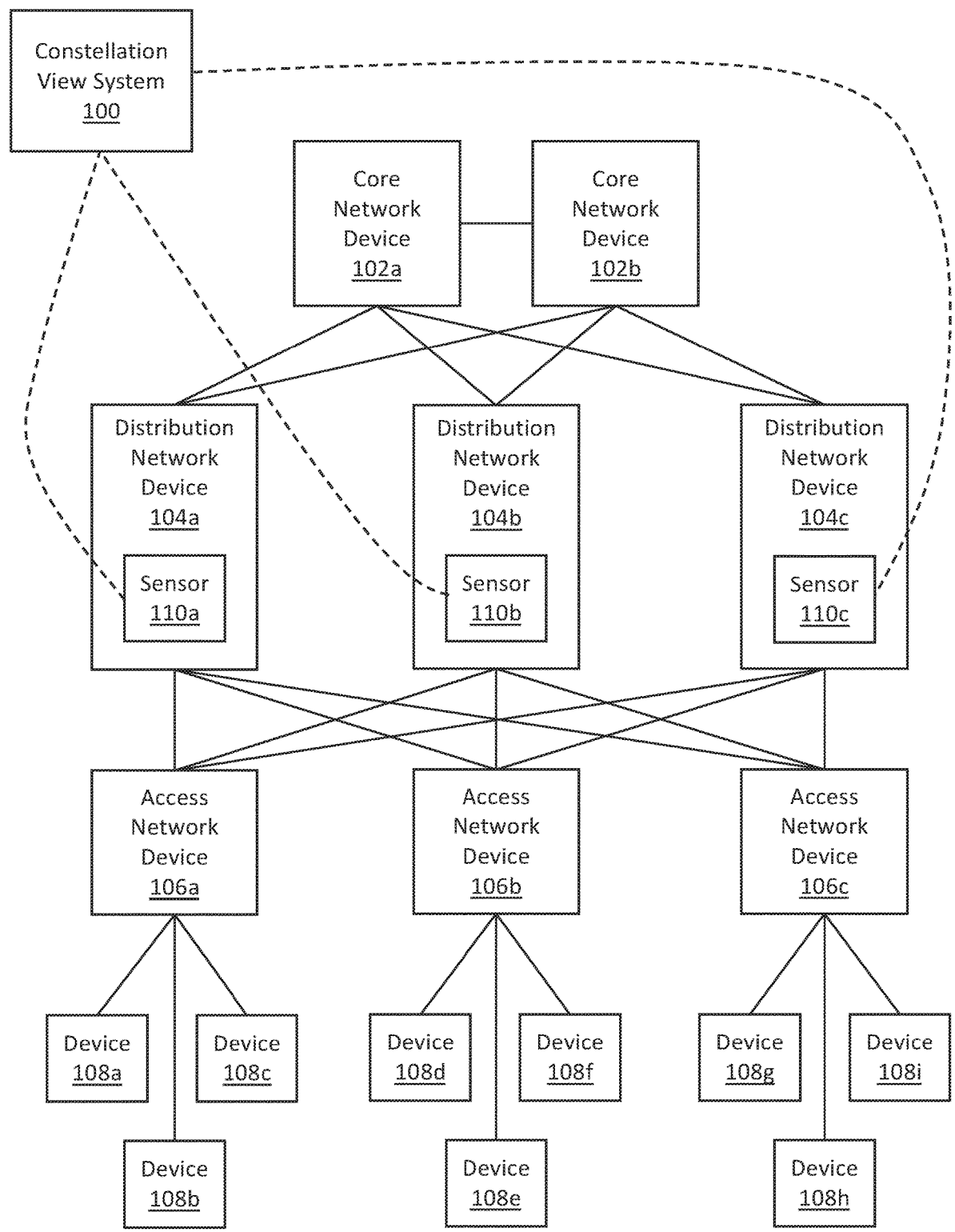
FIGS. 1A-B illustrate example networks including traffic sensors, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TRAFFIC SENSORS IN A NETWORK
3. CONSTELLATION VIEW SYSTEM ARCHITECTURE
4. EXAMPLE GRAPHICAL USER INTERFACES (GUI)
5. DETERMINING ATTRIBUTE VALUES ASSOCIATED WITH A COMMUNICATION SESSION
6. DETERMINING A CURRENT DEVICE PROFILE FOR A DEVICE
7. PRESENTING, AT A GUI, A CONSTELLATION VIEW OF COMMUNICATIONS ASSOCIATED WITH NODE GROUPS
8. HARDWARE OVERVIEW
9. MISCELLANEOUS; EXTENSIONS

1. General Overview

One or more embodiments include determining node group(s) for nodes in a network. A node may refer, for example, to a device, a network address, or a server each of which may be assigned to one or more groups. Nodes of a particular node group share a common attribute. A device group includes a set of devices. Examples of device groups include "Medical Devices," "Mobile Devices," "Printers," and "Physical Security Devices." An address group includes a set of network address (such as, external Internet addresses). Examples of address groups include "US network addresses," "non-US network addresses," and "top 100 visited addresses." An intranet group includes a set of intranet servers. Examples of intranet groups include "mail servers," "Dynamic Host Configuration Protocol (DHCP) servers," and "Lightweight Directory Access Protocol (LDAP) servers."

One or more embodiments include presenting, at a graphical user interface (GUI), a constellation view of communications associated with device groups. Multiple concentric rings are presented at a GUI. Icons on one ring represent device groups; icons on the remaining rings represent other node groups. As an example, icons on an outer ring may represent address groups. Icons on a middle ring may represent device groups. Icons on an inner ring may represent intranet groups. Each icon is selectable to request information about communications associated with the node group represented by the selected icon. Connections from the selected icon are drawn to other icons. The other icons may be on the same ring as the selected icon or a different ring from the selected icon.

In an embodiment, an icon representing a device group is selected. Network addresses to which data packets are transmitted from devices of the device group are identified. Additionally or alternatively, network addresses from which data packets are transmitted to devices of the device group are identified. Address groups associated with the identified network addresses are determined. Connections are drawn between the selected icon and the icons representing the address groups associated with the identified network addresses.

In an embodiment, an icon representing a device group is selected. Intranet servers to which data packets are transmitted from devices of the device group are identified. Additionally or alternatively, intranet servers from which data packets are transmitted to devices of the device group are identified. Intranet groups associated with the identified intranet servers are determined. Connections are drawn between the selected icon and the icons representing the intranet groups associated with the identified intranet servers.

Combining the above embodiments, a GUI may concurrently present (a) connections between the selected icon and the icons representing the address groups associated with the identified network addresses, and (b) connections between the selected icon and the icons representing the intranet groups associated with the identified intranet servers.

An interface element associated with each connection may indicate one or more attributes associated with communications represented by the connection. Additionally or alternatively, each connection is selectable to request additional information on one or more attributes associated with communications represented by the connection.

One or more embodiments include presenting, at a GUI, a constellation view of connections associated with virtual local area network (VLAN) groups. Each VLAN group includes a different set of VLANs in a network. Multiple concentric rings are presented at a GUI. Icons on one ring represent VLAN groups; icons on the remaining rings represent other node groups. As an example, icons on an outer ring may represent address groups. Icons on a middle ring may represent VLAN groups. Icons on an inner ring may represent intranet groups. Each icon is selectable to request information about communications associated with the node group represented by the selected icon. Connections from the selected icon are drawn to other icons. The other icons may be on the same ring as the selected icon or a different ring from the selected icon.

One or more embodiments include presenting, at a GUI, a constellation view of connections associated with subnet groups. Each subnet group includes a different set of subnets (also referred to as "subnetworks") in a network. Multiple concentric rings are presented at a GUI. Icons on one ring represent subnet groups; icons on the remaining rings represent other node groups. As an example, icons on an outer ring may represent address groups. Icons on a middle ring may represent subnet groups. Icons on an inner ring may represent intranet groups. Each icon is selectable to request information about communications associated with the node group represented by the selected icon. Connections from the selected icon are drawn to other icons. The other icons may be on the same ring as the selected icon or a different ring from the selected icon.

A large amount of traffic is communicated in a network. It might be burdensome on a user to manually review tables or lists showing information about the traffic. However, using a constellation view, a user can easily visualize the types and levels of traffic occurring between different nodes of a network. A user can easily select icons and/or connections to request more information about nodes and/or communications in a network.

One or more embodiments described in this Specification and/or recited in the claims may not be included in this General Overview section.

2. Traffic Sensors in a Network

Figure 1B:
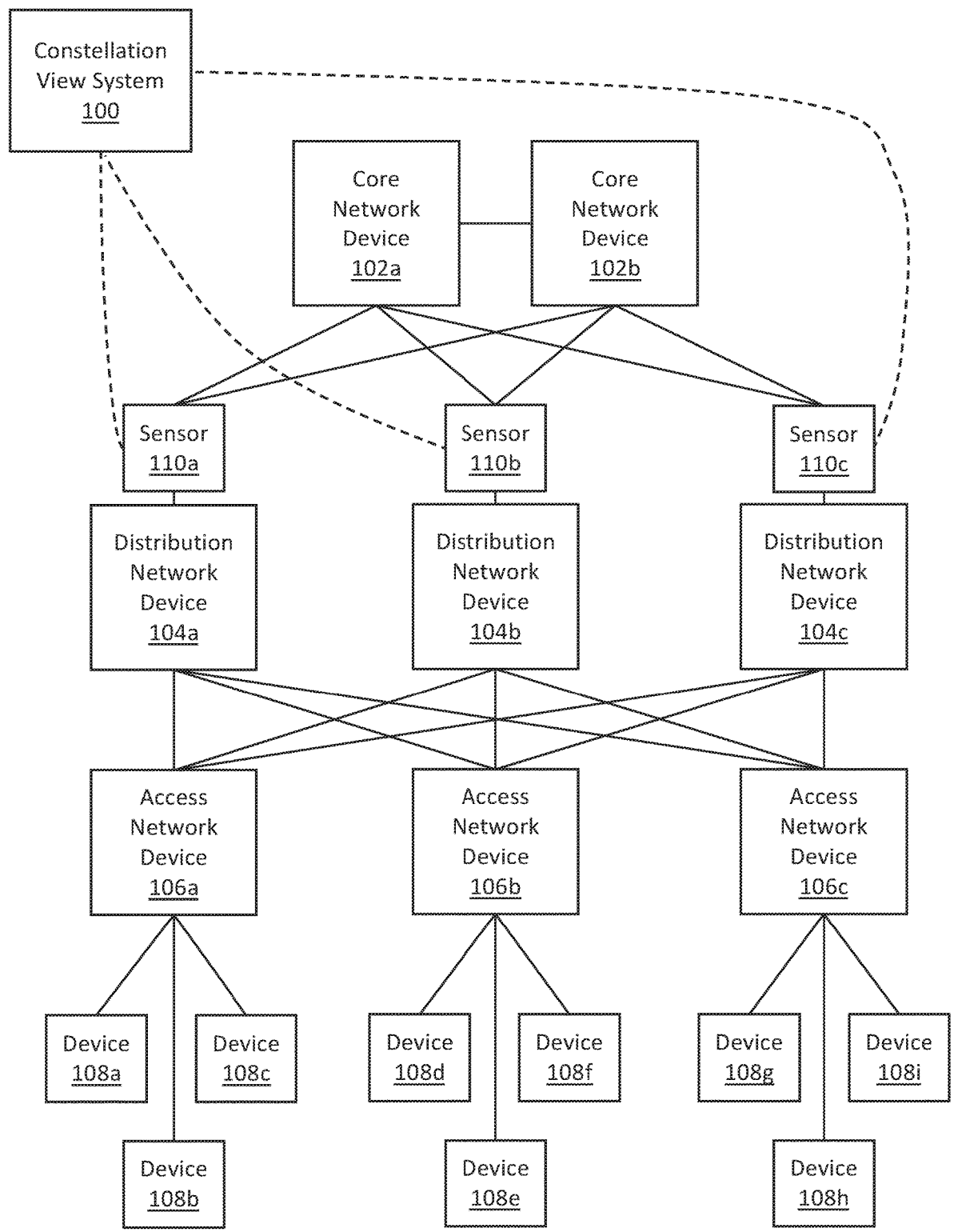

FIGS. 1A-B illustrate example networks including traffic sensors, in accordance with one or more embodiments.

In one or more embodiments, a network device is configured to connect end devices in a network. Examples of network devices include routers, switches, bridges, hubs, and/or gateways. An end device is a source device or a destination device in a network. End devices include user devices, such as computers, printers, servers, smartphones, smart appliances, smart thermostats, security cameras, networked medical equipment (such as x-ray machines, thermometers, and blood pressure monitors), networked manufacturing machines, networked sensors, and/or IoT devices. Additionally or alternatively, end devices include intranet servers that facilitate communications in an intranet, such as mail servers, Dynamic Host Configuration Protocol (DHCP) servers, and Lightweight Directory Access Protocol (LDAP) servers.

In one or more embodiments, a set of network devices implementing a network are arranged in a network hierarchy. The network hierarchy includes one or more of the following layers: a core layer, a distribution layer, and an access layer.

A core layer is considered a backbone of the network. The core layer includes a set of core-layer network devices 102a-b (also referred to herein as "core network devices") that are typically associated with the highest speed and/or efficiency, as compared to network devices in the other layers of the network hierarchy. The core network devices 102a-b may be used to merge geographically-separated networks.

A distribution layer is positioned between a core layer and an access layer. The distribution layer provides policy-based connectivity between the access and core layers. The distribution layer thereby controls the boundary between the access and core layers. The distribution layer may achieve boundary control by implementing access lists and other filters. The distribution layer includes a set of distribution network devices 104a-c that route traffic between subnets, virtual local area networks (VLANs), and/or broadcast domains in the network.

An access layer provides workgroups and/or users access to the network. The access layer includes a set of access-layer network devices 106a-c (also referred to herein as "access network devices") connected to end devices 108a-h. The access layer may include access points (APs) to wirelessly connect end devices to the network. As illustrated, access network device 106a connects end devices 108a-c to the network. Access network device 106b connects end devices 108d-f to the network. Access network device 106c connects end devices 108g-i to the network.

In one or more embodiments, a traffic sensor (such as, sensors 110a-c) is configured to capture data packets transmitted to and/or from a device in a network. A traffic sensor may be configured as a Test Access Point (TAP) or a Switched Port Analyzer (SPAN). A traffic sensor may also be used in alternate configurations.

In one or more embodiments, sensors 110a-c are attached to the distribution layer of a network hierarchy. Since the distribution layer processes traffic between subnets, virtual local area networks (VLANs), and/or broadcast domains of the network, sensors 110a-c attached to the distribution layer may be able to capture a significant portion of all traffic in the network.

Referring to the example illustrated in FIG. 1A, sensors 110a-c are implemented respectively within distribution network devices 104a-c. As a distribution network device routes traffic from one port to another port, a sensor of the distribution network device sends a copy of the traffic to a SPAN port (also known as a mirror port). Data packets are hence captured at the SPAN port of the distribution network device for analysis. Data packets are transmitted from the SPAN port to a constellation view system 100. A constellation view system 100 is further described below with reference to FIG. 2.

Referring to the example illustrated in FIG. 1B, sensors 110a-c are positioned in-line between the distribution layer and the core layer. As illustrated, sensor 110a is between distribution network device 104a and core network device 102a. Sensor 110b is between distribution network device 104b and core network device 102b. Sensor 110c is between distribution network device 104c and core network device 102c. A sensor performs a passive splitting mechanism. The sensor receives traffic through a particular port. The sensor then forwards the traffic to at least two ports: one port associated with the intended destination of the traffic, and a monitoring port. Data packets are hence captured at the monitoring port of the sensor for analysis. Data packets are transmitted from the monitoring port to a constellation view system 100. A constellation view system 100 is further described below with reference to FIG. 2.

In other embodiments, sensors 110a-c are attached to additional or alternative layers of the network hierarchy. For example, sensors may be attached to one or more core network devices 102a-b, and/or one or more access network devices 106a-c. In yet other embodiments, network devices may be arranged differently, and sensors 110a-c may be attached to the network devices in a different arrangement.

3. Constellation View System Architecture

Figure 2:
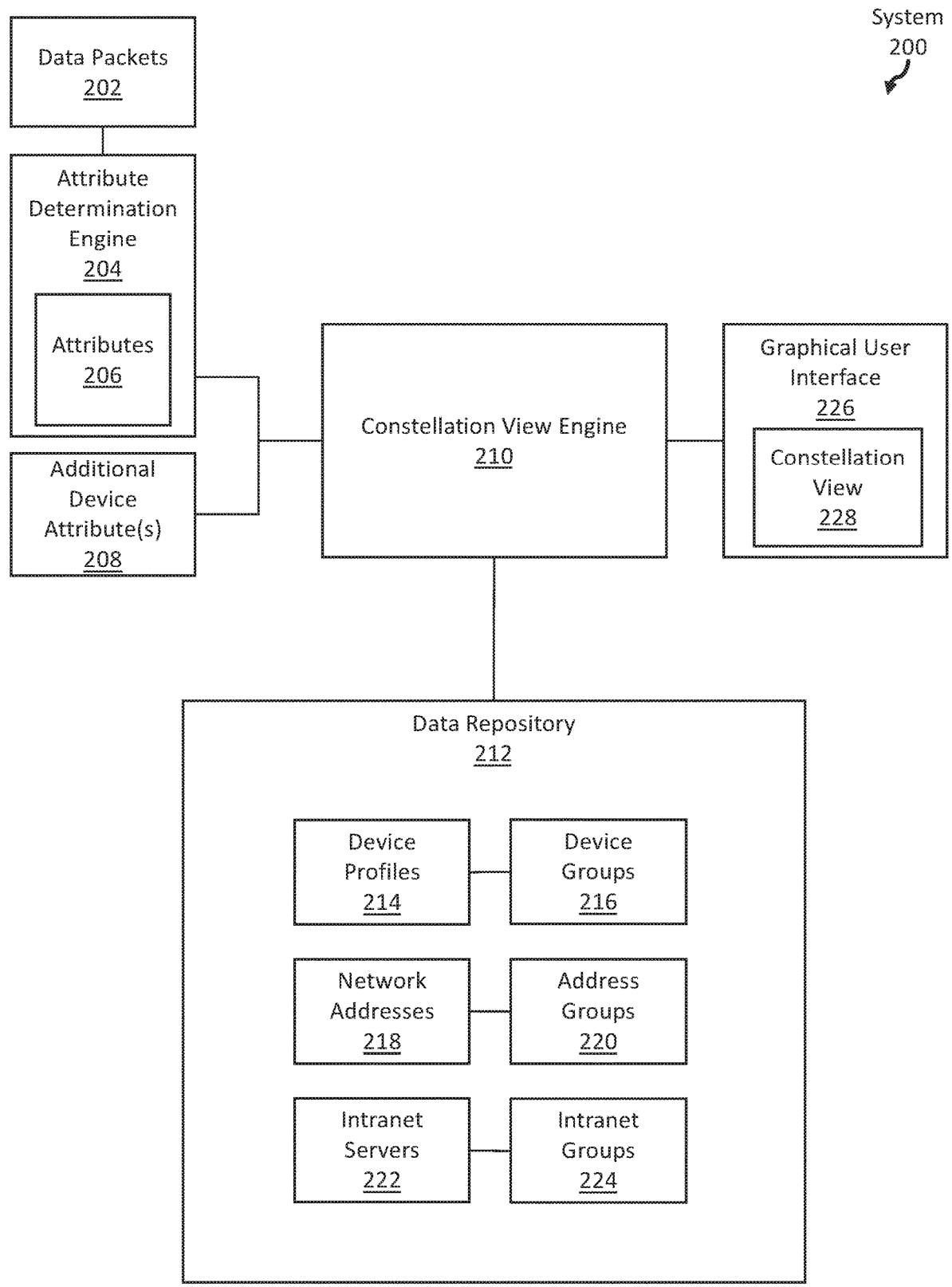
FIG. 2 illustrates an example constellation view system, in accordance with one or more embodiments.

FIG. 2 illustrates an example constellation view system, in accordance with one or more embodiments. As illustrated in FIG. 2, a system 200 includes data packets 202 captured from a network, an attribute determination engine 204, additional device attributes 342, a constellation view engine 208, a data repository 342, and a graphical user interface (GUI) 214. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In one or more embodiments, data packets 202 are data packets that are captured from a network (such as the networks shown in FIGS. 1A-B). The data packets 202 are communicated to and/or from one or more devices in the network. The data packets 202 may be communicated internally within the network. Additionally or alternatively, the data packets 202 may be communicated externally to an external network (such as, the Internet). As described above, a sensor may capture data packets 202 at a distribution layer of a network hierarchy, and/or at other layers of the network hierarchy. A sensor may be configured as a TAP or SPAN to capture data packets 202. Different arrangements of sensors on different network structures may also be used.

In one or more embodiments, an attribute determination engine 204 refers to software and/or hardware configured to determine values for a set of attributes 206 of communication sessions conducted by devices in a network. A value for an attribute 206 may also be referred to herein as an "attribute value." Examples of operations for determining attribute values for a communication session conducted by a device in a network are described below with reference to FIG. 12.

In one or more embodiments, types of attributes 206 include but are not limited to:
(a) Flow attributes: attributes associated with a flow of a communication session, including attributes associated with an Internet Protocol (such as, Internet Protocol version 4 (IPv4), Internet Protocol version 6 (IPv6)) used by a communication session;

(b) DNS attributes: attributes associated with a Domain Name System (DNS) protocol used by a communication session;
(c) DHCP attributes: attributes associated with a Dynamic Host Configuration Protocol (DHCP) used by a communication session;
(d) DICOM attributes: attributes associated with a Digital Imaging and Communications in Medicine (DICOM) protocol used by a communication session;
(e) POCT attributes: attributes associated with a Point of Care Testing (POCT) protocol used by a communication session;
(f) CIP attributes: attributes associated with a Common Industrial Protocol (CIP) used by a communication session;
(g) SIP attributes: attributes associated with a Session Initiation Protocol (SIP) used by a communication session;
(h) RTSP attributes: attributes associated with a Real Time Streaming Protocol (RTSP) used by a communication session; and/or
(i) BACnet attributes: attributes associated with a Building Automation and Control network (BACnet) protocol used by a communication session.

Attributes associated with a flow of a communication session may include any of: a source address (such as an IP address and/or a Media Access Control (MAC) address); a destination address; a source port; a destination port; a number of transmitted bytes; a number of received bytes; a source subnet; and a destination subnet.

Attributes associated with a particular protocol (such as, IPv4, IPv6, DNS, DICOM, POCT, CIP, SIP, RTSP, DHCP, and BACnet) include values for standard fields specified and/or defined by a corresponding protocol specification. The standard fields may be included in a header, tail, and/or other portion of a data packet.

As an example, standard fields in an IPv4 data packet include any of: Internet Protocol Version; Internet Header Length; Differentiated Services Code Point (DSCP); Explicit Congestion Notification (ECN); Total Length; Identification (for example, for identifying the group of fragments of a single IP datagram); Flags; Fragment Offset; Time to Live (TTL); Protocol (for example, for defining the protocol used in the data portion of the IP datagram); Header Checksum; Source Address; Destination Address; and Options. Additional and/or alternative standard fields may be used. A value for a standard field in an IPv4 data packet may be a value for an attribute 206 of a communication session.

As another example, standard fields in a DNS query or response include any of: Identification; Flags; Number of Questions; Number of Answers; Number of Authority Resource Records (RRs); Number of Additional RRs; Request Type. Additional and/or alternative standard fields may be used. A value for a standard field in a DNS query or response may be a value for an attribute 206 of a communication session.

As another example, standard fields in a DHCP packet include any of: MAC address; IP address; subnet; host name; DHCP Options; DHCP Class Identifier; Manufacturer; DHCP Parameter List; and DHCP Vendor Class. Additional and/or alternative standard fields may be used. A value for a standard field in a DHCP data packet may be a value for an attribute 206 of a communication session.

As another example, DICOM is a protocol for the communication and management of medical imaging information and related data. Standard fields in a DICOM data packet include any of: Creation Time; Manufacturer; Institution Name; Referring Physician's Name; Consulting Physician's Name; Operator's Name; Warning Reason; Failure Reason; Patient's Name; Patient Identifier; Patient's Birth Date; Patient's Sex; Image Size. Additional and/or alternative standard fields may be used. A value for a standard field in a DICOM data packet may be a value for an attribute 206 of a communication session.

Additionally or alternatively, an attribute 206 of a communication session may include statistics and/or characteristics of the communication session. For example, attributes may include any of: a number of data packets in the communication session; a number of communication sessions that share a common set of attribute values; a frequency of communication sessions that share a common set of attribute values; a duration of the communication session; and whether or not the communication session is secure.

In one or more embodiments, an additional device attribute 208 is an attribute, associated with a device in a network, that is determined based on information in addition to or in lieu of information that is inferred from data packets 202 detected in the network. Additional device attribute 208 may be specified by a user and/or an application. Examples of additional device attributes 208 include a serial number of a device, a maintenance schedule of a device, a warranty on a device.

In one or more embodiments, a data repository 212 is any type of storage unit and/or device (e.g., a file system, database, collection of tables, or any other storage mechanism) for storing data. Further, a data repository 212 may include multiple different storage units and/or devices. The multiple different storage units and/or devices may or may not be of the same type or located at the same physical site. Further, a data repository 212 may be implemented or executed on the same computing system as an attribute determination engine 204 and/or constellation view engine 210. Alternatively or additionally, a data repository 212 may be implemented or executed on a computing system separate from an attribute determination engine 204 and/or constellation view engine 210. The data repository 212 may be communicatively coupled to the attribute determination engine 204 and/or constellation view engine 210 via a direct connection or via a network.

Information describing device profiles 214, device groups 216, network addresses 218, address groups 220, intranet servers 222, and intranet groups 224 may be implemented across any of components within the system 200. However, this information is illustrated within the data repository 212 for purposes of clarity and explanation.

In one or more embodiments, a device profile 214 includes a set of attributes associated with a device. A device profile 214 includes (a) a device photo for a device, (b) expected attribute values associated with a device, (c) a device group and/or category for a device, and/or (d) expected attribute values for a device. Examples of operations for determining a device profile 214 for a target device are described below with reference to FIG. 13.

In one or more embodiments, a device group 216 is a grouping of device profiles 214. Device profiles 214 of the same device group 216 share one or more common attributes. Examples of device groups 216 includes laptops, smartphones, and medical devices. A device group 216 associated with a set of device profiles 214 include a set of devices associated with the particular set of device profiles 214. A particular device profile 214 may be associated with one or more device groups 216. As an example, a device group may be laptops. Device profiles associated with the device group may include: Mac laptop and Windows laptop.

Devices in a network may include Mary Jone's Mac laptop, Mary Jone's smartphone, Samuel Brown's Window laptop, and a smart thermostat. Since Mary Jone's Mac laptop and Samuel Brown's Window laptop are associated with device profiles of the device group, the device group of laptops includes Mary Jone's Mac laptop and Samuel Brown's Window laptop. The device group does not include Mary Jone's smartphone or the smart thermostat.

In one or more embodiments, a network address 218 is an address used to communicate with a node in a network. A network address 218 may be an address internal to a network or an address external to a network. A network address 218 may be, for example, an Internet network address used to communicate with a node over the Internet.

In one or more embodiments, an address group 220 is a grouping of network addresses 218. Network addresses 218 of the same address group 220 share one or more common attributes. A particular network address 218 may be associated with one or more address groups 220. As an example, an address group may be "Non-US addresses." The address group may include network addresses associated with devices located outside of the US. Another address group may be "Top 100 Visited Addresses." The address group may include the top 100 network addresses that are the most visited, as determined by a particular application and/or organization. Another address group may be "Malicious Addresses." The address group may include network addresses that are known to perform malicious behavior. A particular network address may belong to, for example, both the "Non-US addresses" group and the "Top 100 Visited Addresses" group.

In one or more embodiments, intranet servers 222 are servers that facilitate the performance of network functions in a network. Examples of intranet servers include a mail server, a DHCP server, and an LDAP server.

In one or more embodiments, an intranet group 224 is a grouping of intranet servers 222. Intranet servers 222 of the same intranet group 224 share one or more common attributes. A particular intranet server 222 may be associated with one or more intranet groups 224. As an example, an intranet group may be "mail servers." The intranet group may include Mail Server A and Mail Server B, both of which perform the function of handling electronic mail in a network.

In one or more embodiments, a data repository 212 stores mappings between device profiles 214 and device groups 216. A data repository 212 stores mappings between network addresses 218 and address groups 220. A data repository 212 stores mappings between intranet servers 222 and intranet groups 224. Mappings may be stored in any format. As an example, a set of mappings may be stored in table. As another example, a device profile may include a field for storing a device group associated with the device profile. The device profile stores an identifier of the device group in the field.

In one or more embodiments, a data repository 212 stores information about virtual local area networks (VLANs), VLAN groups, subnets, and subnet groups (not illustrated). A VLAN is a broadcast domain that is partitioned and isolated in a computer network at the data link layer (such as Layer 2 of the Open Systems Interconnection (OSI) model). A subnetwork (also referred to herein as a "subnet") is a logical subdivision of an IP network. Analogous to a device group 216, a VLAN group is a grouping of VLANs, and a subnet group is a grouping of subnets. Device groups 216, address groups 220, intranet groups, VLAN groups, and/or subnet groups may be referred to herein as "node groups."

In one or more embodiments, a graphical user interface (GUI) 214 refers to hardware and/or software configured to facilitate communications between (a) a user and (b) an attribute determination engine 204 and/or a constellation view engine 210. A GUI 214 may be rendered and/or displayed on a screen and/or monitor. A GUI 214 may present one or more interface elements for presenting information to a user and/or for receiving information from a user. Examples of interface elements include checkboxes, radio buttons, dropdown lists, list boxes, buttons, toggles, text fields, date and time selectors, command lines, sliders, pages, forms, and/or icons. Interface elements may be associated with different colors, sizes, shapes, and/or other visualizations. Interface elements may be associated with animations, such as motion across GUI, appearing and/or disappearing on a GUI, changing shape, changing size, and changing color. Interface elements may be associated with noise and/or sound. Other types of user interfaces include a command line interface (CLI), a haptic interface, and a voice command interface.

Components of a GUI 214 may be specified in one or more languages, such as Java, C, and/or C++. In some embodiments, the behavior of interface elements is specified in a dynamic programming language, such as JavaScript. The content of interface elements is specified in a markup language, such as hypertext markup language (HTML) or XML User Interface Language (XUL). The layout of interface elements is specified in a style sheet language, such as Cascading Style Sheets (CSS).

In an embodiment, a GUI 214 presents a constellation view 228. A constellation view 228 is a particular presentation of information associated with traffic transmitted in a network. Icons in a constellation view represent one or more device groups 216, address groups 220, intranet groups 224, VLAN groups, and/or subnet groups. The icons are arranged on different concentric rings. Connections between the different rings represent traffic between the different groups. Examples of constellation views 228 are described below with reference to FIGS. 4-8.

In an embodiment, a GUI 214 additionally presents additional information associated with a constellation view 228. The GUI 214 may present one or more device profiles 214 and/or additional device attributes 208 associated with a particular device for which a user requests additional information through the GUI 214.

In one or more embodiments, a constellation view engine 210 refers to hardware and/or software configured to present, at a GUI 226, a constellation view 228 to a user. A constellation view engine 210 Examples of operations for presenting, at a GUI 226, a constellation view 228 are described below with reference to FIGS. 14A-B.

In one or more embodiments, an attribute determination engine 204, a constellation view engine 210, and/or a GUI 214 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, an access point, a mainframe, a television, a content receiver, a set-top box, a printer, a mobile handset, a smartphone, a personal digital assistant (PDA), and/or a traffic sensor.

4. Example Graphical User Interfaces (GUI)

Figure 3:
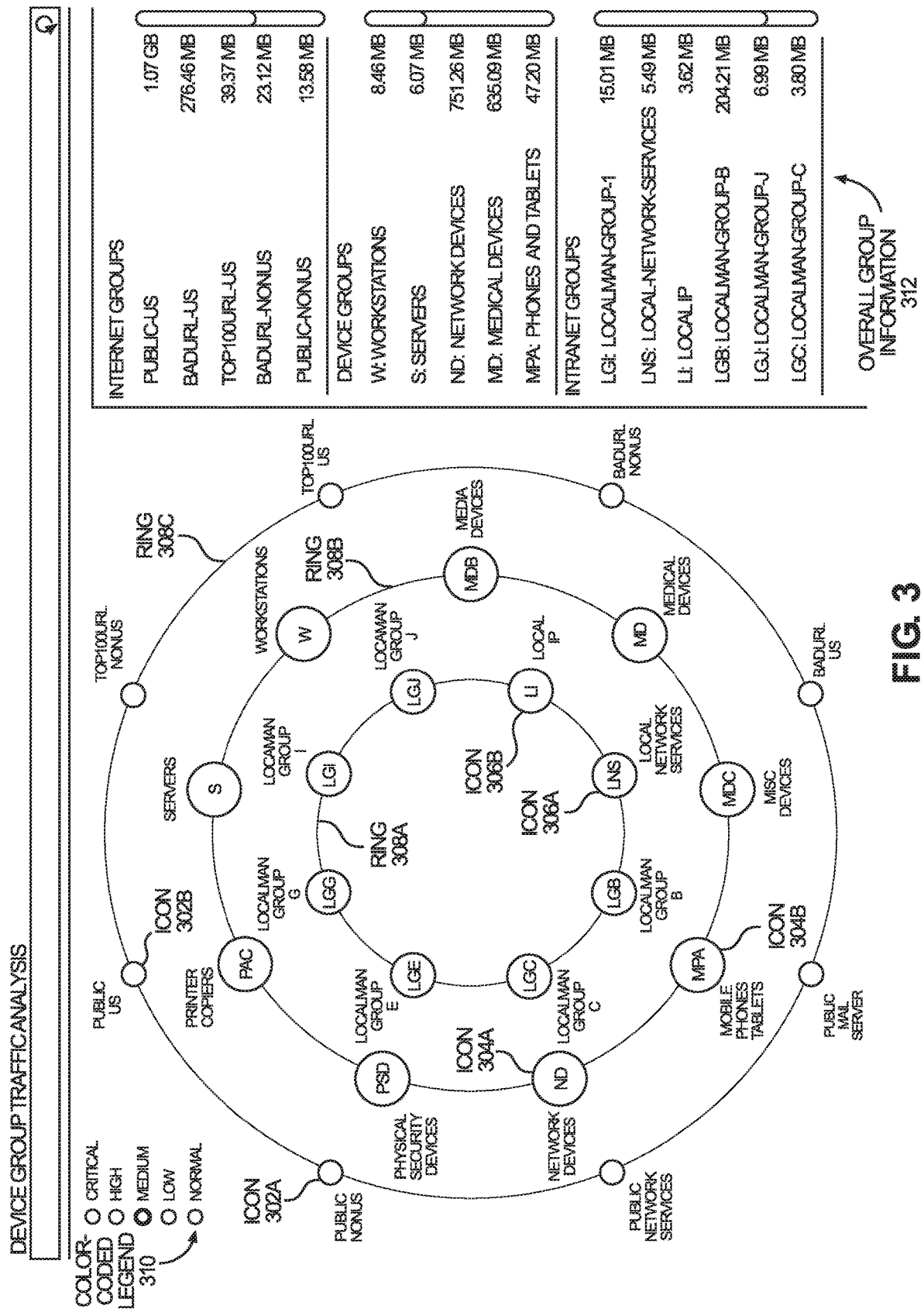
FIG. 3 illustrates an example graphical user interface (GUI) showing a constellation view for device groups, in accordance with one or more embodiments.

FIG. 3 illustrates an example graphical user interface (GUI) showing a constellation view for device groups, in accordance with one or more embodiments. As illustrated, GUI 300 shows icons representing node groups in concentric rings.

Ring 308*a* is associated with intranet servers. Icons 306*a-b* are positioned on ring 308*a*. Icon 306*a* represents "Local Network Services." Icon 306*b* represents "Local IP." "Local Network Services" and "Local IP" are different groupings of intranet servers.

Ring 308*b* is associated with devices. Icons 304*a-b* are positioned on ring 308*b*. Icon 304*a* represents "Network Devices." Icon 304*b* represents "Mobile Phones Tablets." "Network Devices" and "Mobile Phones Tablets" are different groupings of devices.

Ring 308*c* is associated with network addresses. Icons 302*a-b* are positioned on ring 308*c*. Icon 302*a* represents "Public Non-US" addresses. Icon 302*b* represents "Public US" addresses. "Public Non-US" and "Public US" are different groupings of network addresses.

GUI 300 further shows overall group information 312. Overall group information 312 includes information about each node group, such as a level of traffic communicated to and/or from each node group. As illustrated, overall group information 312 shows the level of traffic in both numerical and graphical form. Overall group information 312 specifies a numerical amount of traffic (for example "1.07 GB") being communicated to and/or from a node group. Overall group information 312 also shows a bar chart indicating the traffic level. The length of the bar indicates a relative traffic level as compared with other node groups.

GUI 300 further shows a color-coded legend 310. The color-coded legend 310 indicates that different colors used on the GUI 300 indicate different risk levels. Red indicates critical security risk. Orange indicates a high security risk. Yellow indicates a medium security risk. Green indicates a low security risk. Blue indicates a normal security risk. Any interface element may be associated with one of the colors of the color-coded legend 310. As an example, icon 304*a* may be presented in red. The color of icon 304*a* may indicate that devices of the "Network Devices" group are associated with a critical security risk. As another example, a connection between two icons (further described below with reference to FIG. 4) may be presented in orange. The color of the connection may indicate that communications between the two node groups are associated with a high security risk.

Any of the icons 302*a-b*, 304*a-b*, 306*a-b* shown on GUI 300 are selectable to request information about the communications of the selected group, as further described below with reference to FIG. 4.

Figure 4:
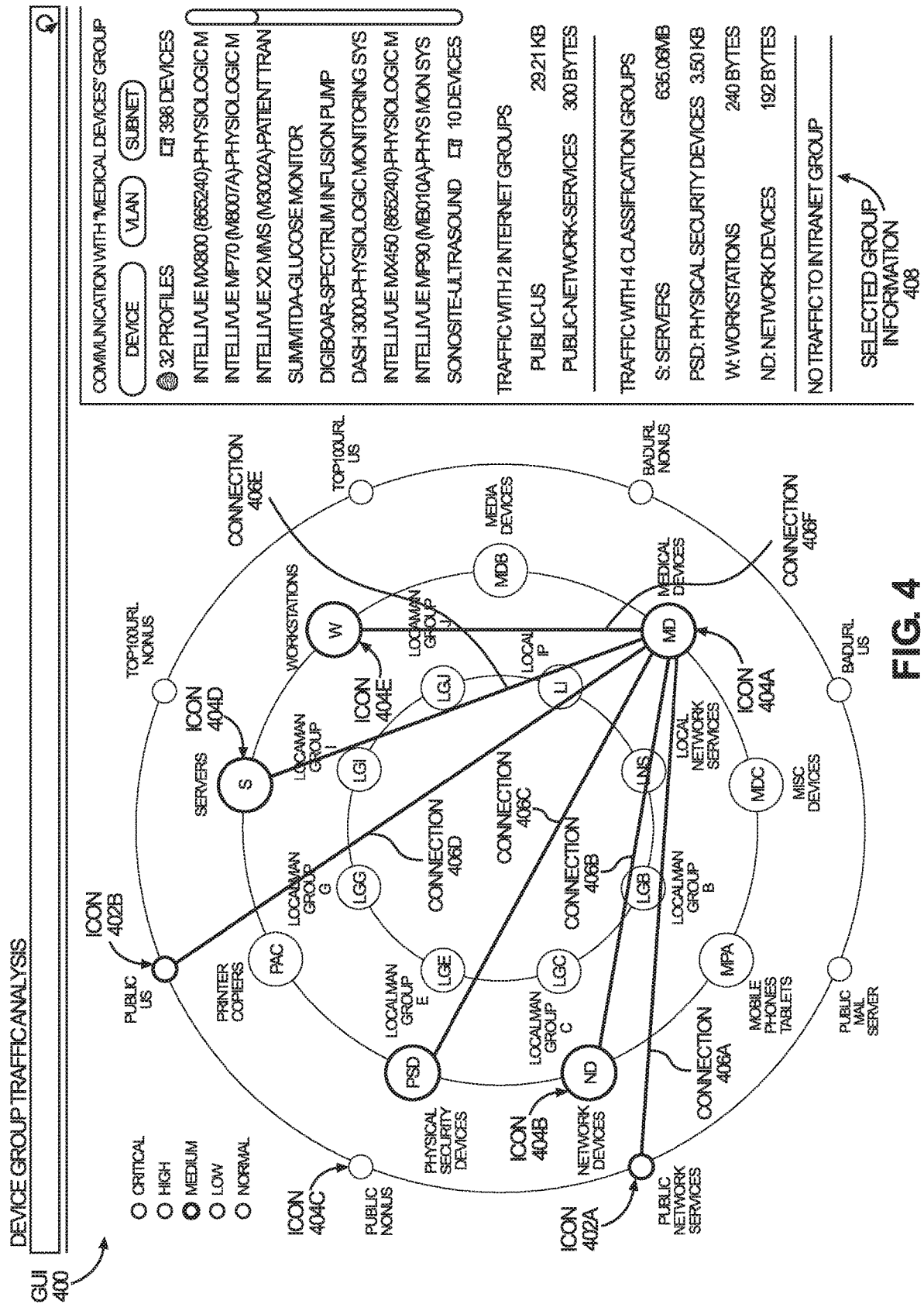
FIG. 4 illustrates an example GUI showing a constellation view for device groups, in accordance with one or more embodiments.

FIG. 4 illustrates an example GUI showing a constellation view for device groups, in accordance with one or more embodiments. As illustrated, GUI 400 shows connections between various icons that are arranged in concentric rings.

Icon 404*a* is positioned on a middle ring. Icon 404*a* represents a device group, "Medical Devices." A user has selected icon 404*a*. In response to the user selection, traffic associated with devices of the "Medical Device" group are presented at the GUI 400.

Connection 406*a* connects icon 404*a* and icon 402*a*. Icon 402*a* is positioned on an outer ring. Icon 402*a* represents an address group, "Public Network Services." Connection 406*a* indicates that there is communication between devices of the "Medical Device" group and network addresses of the "Public Network Services" group.

Connection 406*b* connects icon 404*a* and icon 404*b*. Icon 404*b* is positioned on the middle ring. Icon 404*b* represents a device group, "Network Devices." Connection 406*a* indicates that there is communication between devices of the "Medical Device" group and devices of the "Network Devices" group.

Connection 406*c* connects icon 404*a* and icon 404*c*. Icon 404*c* is positioned on the middle ring. Icon 404*c* represents a device group, "Physical Security Devices." Connection 406*a* indicates that there is communication between devices of the "Medical Device" group and devices of the "Physical Security Devices" group.

Connection 406*d* connects icon 404*a* and icon 402*b*. Icon 402*b* is positioned on the outer ring. Icon 404*b* represents an address group, "Public US." Connection 406*a* indicates that there is communication between devices of the "Medical Device" group and network addresses of the "Public US" group.

Connection 406*e* connects icon 404*a* and icon 404*d*. Icon 404*d* is positioned on the middle ring. Icon 404*d* represents a device group, "Servers."

Connection 406*f* connects icon 404*a* and icon 404*e*. Icon 404*e* is positioned on the middle ring. Icon 404*e* represents a device group, "Workstations."

Connections (not illustrated) may also be presented between icon 404*a* and an icon on an inner ring.

GUI 400 further shows selected group information 408. Selected group information 408 includes information about the devices and/or nodes within the selected group. Additionally or alternatively, selected group information 408 includes information about the node groups that have communication with the selected group. As illustrated, selected group information 408 shows that there are 32 devices within the selected group, "Medical Devices." Selected group information 408 includes an identifier of each device. Further, selected group information 408 indicates that the "Medical Devices" group has communications with two address groups, "Public US" and "Public Network Services." Further, selected group information 408 indicates that the "Medical Devices" group has communications with four other device groups, "Servers," "Physical Security Devices," "Workstations," and "Network Devices." Further, selected group information 408 indicates that the "Medical Devices" group has no communications with any intranet groups.

Any of the connections 406*a-f* shown on GUI 400 are selectable to request information about the communications represented by the selected connection, as further described below with reference to FIG. 5.

Figure 5:
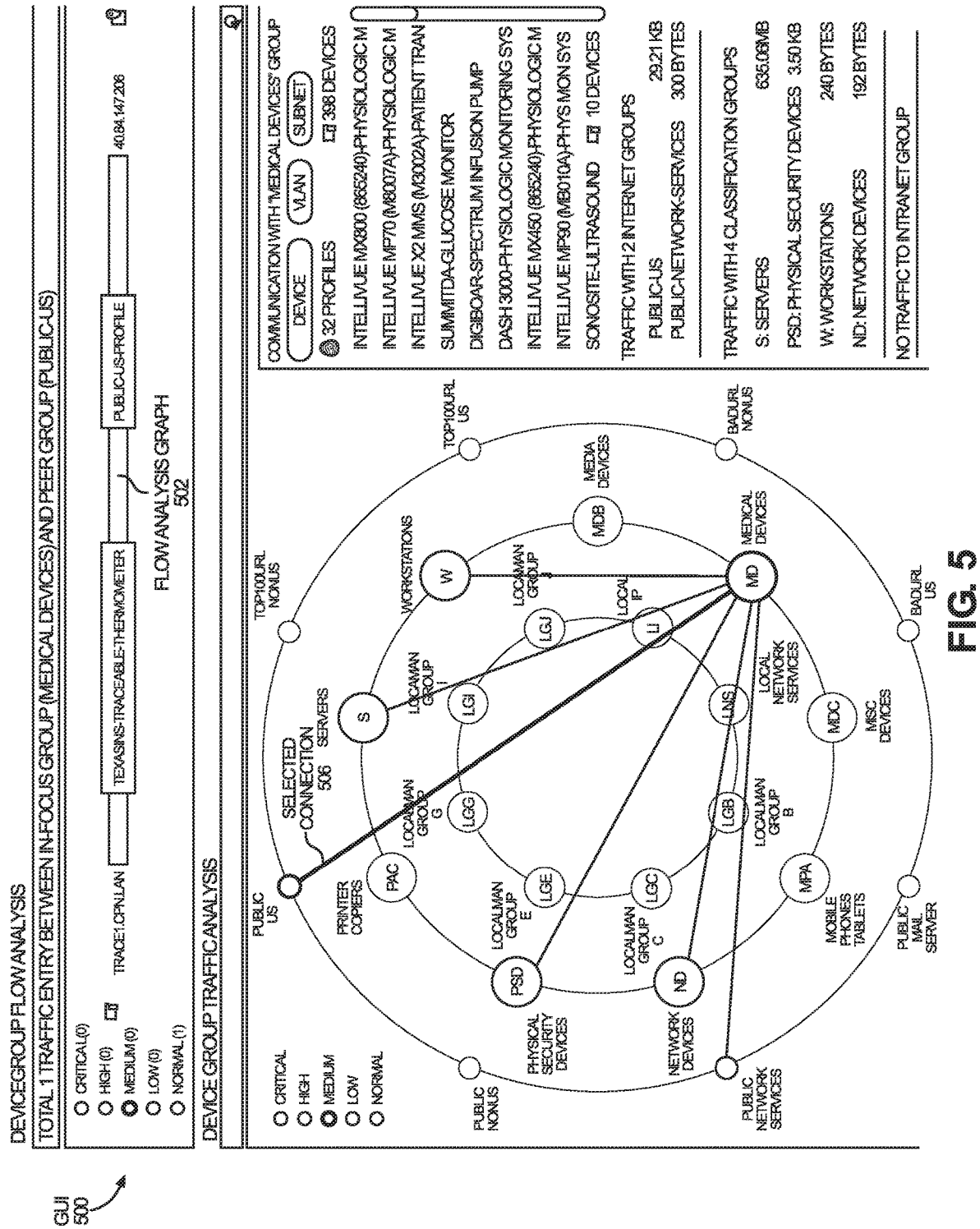
FIG. 5 illustrates an example GUI showing additional information associated with a connection shown in a constellation view, in accordance with one or more embodiments.

FIG. 5 illustrates an example GUI showing additional information associated with a connection shown in a constellation view, in accordance with one or more embodiments. As illustrated, GUI 500 shows additional information about a connection presented above a constellation view.

A user has selected a connection 506 shown in the constellation view. The selected connection 506 connects a device group, "Medical Devices," and an address group, "Public US." In response to the user selection, flow analysis graph 502 is presented.

Flow analysis graph 502 shows information about the flows the "Medical Devices" group and the "Public US" group. In particular, flow analysis graph 402 is a Sankey diagram showing communications between devices and network addresses. The Sankey diagram includes four junctions: device name, device profile, address group, and network address. The device name junction indicates device names and/or identifiers of devices within the "Medical Devices" group. The device profile junction indicates device profiles of devices within the "Medical Devices" group. The address group junction indicates the address group, "Public US." The network addresses junction indicates the specific addresses within "Public US" that have communications with "Medical Devices."

As illustrated, that there is a particular device within "Medical Device" associated with a device name, Trace1.cpn.lan, and a device profile, a Texas Instruments Traceable Thermometer. The particular device has communications with addresses within the "Public US" group. A specific address within the "Public US" group is 40.84.147.206.

A map icon next to the address 40.84.147.206 is selectable to request information about a geographical location associated with 40.84.147.206. A map of the geographical location associated with 40.84.147.206 may be presented.

Any devices shown in flow analysis graph 402 is selectable to request additional information about the selected device.

Figure 6:
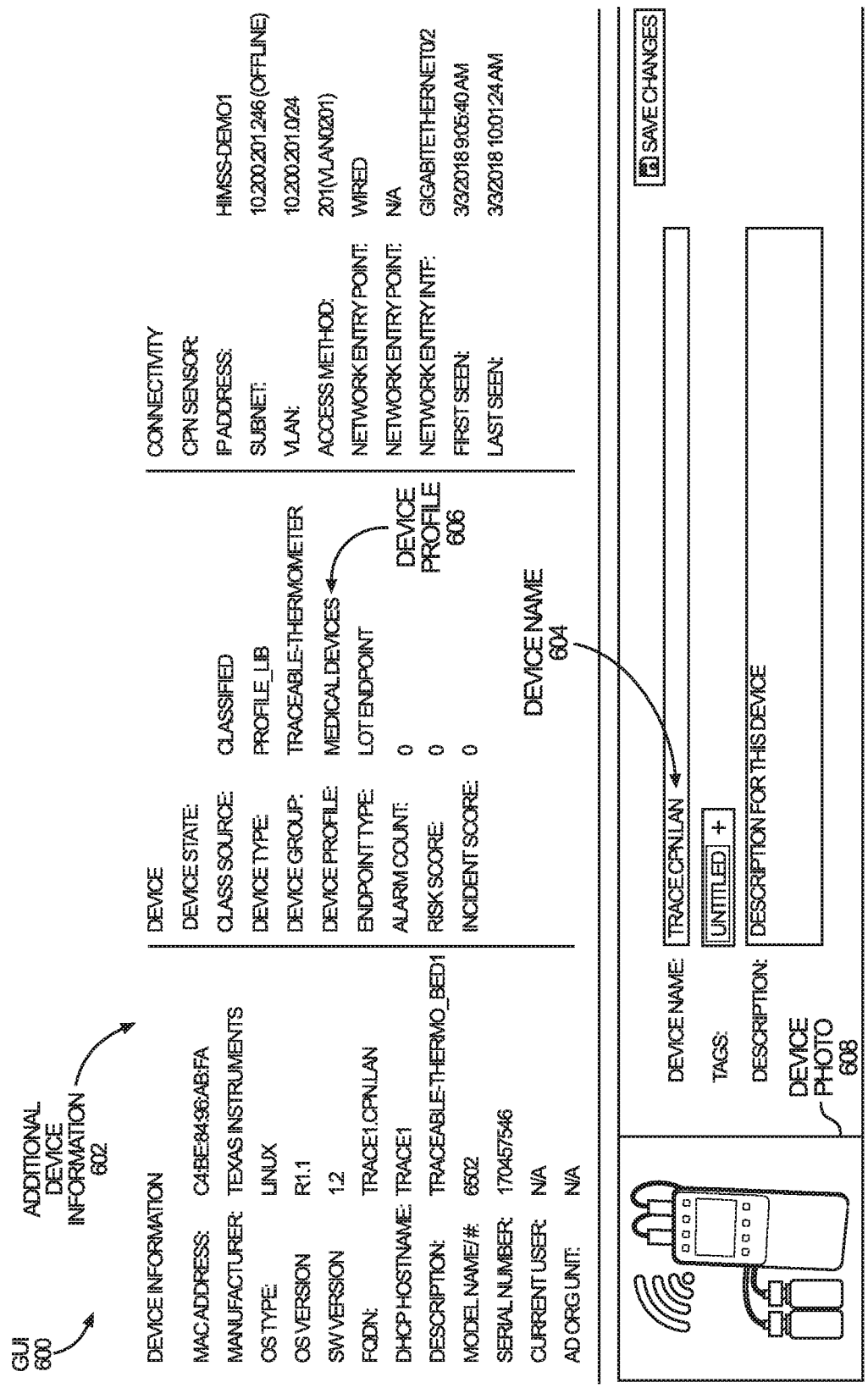
FIG. 6 illustrates an example GUI showing additional information associated with a connection shown in a constellation view, in accordance with one or more embodiments.

FIG. 6 illustrates an example GUI showing additional information associated with a connection shown in a constellation view, in accordance with one or more embodiments. As illustrated, GUI 600 shows additional information about a device. The additional information about the device may be presented above a constellation view and/or additional information about a connection within a constellation view.

A user has selected a device, Texas Instruments Traceable Thermometer, shown in a flow analysis graph about a particular connection shown in a constellation view. In response to the user selection, additional device information 602 is presented.

Additional device information 602 includes device name 604, device profile 606, and device photo 608. Device name 604 is a unique identifier associated with the selected device. Based on analyzing attribute values for communication sessions conducted by the selected device, device profile 606 is determined for the selected device. One or more devices may be associated with the same device profile 606. Device photo 608 is a photo corresponding to the device profile 606.

As illustrated, the selected device is associated with a device name 604, Trace1.cpn.lan. The selected device is associated with a device profile 606, Texas Instruments Traceable Thermometer. Device photo 608 shows an image of a Texas Instruments Traceable Thermometer.

Figure 7:
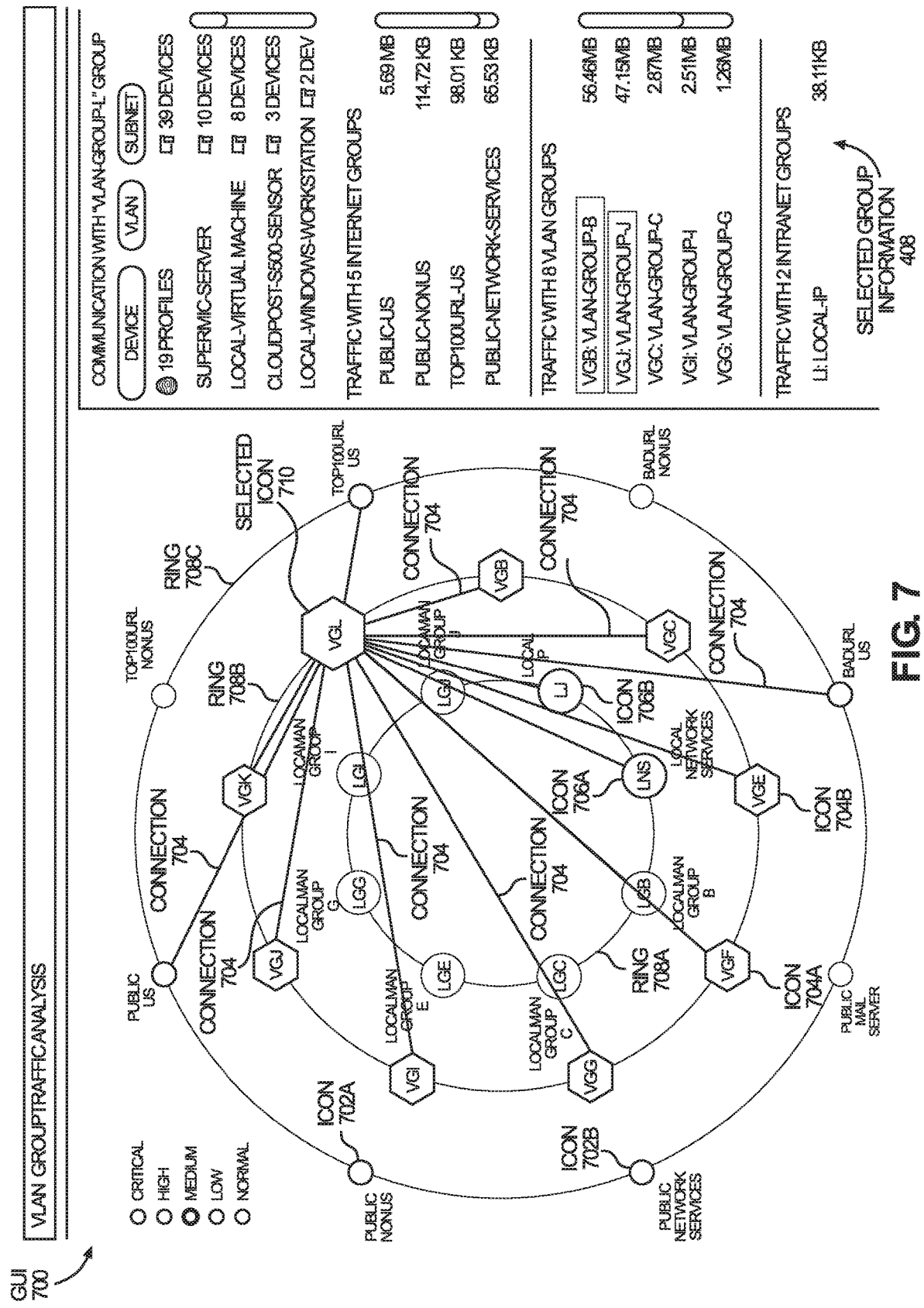
FIG. 7 illustrates an example GUI showing a constellation view for virtual local area network (VLAN) groups, in accordance with one or more embodiments.

FIG. 7 illustrates an example GUI showing a constellation view for virtual local area network (VLAN) groups, in accordance with one or more embodiments. GUI 700 is similar to GUI 300, except VLAN groups are shown instead of device groups. As illustrated, GUI 700 shows icons representing node groups in concentric rings.

Ring 708a is associated with intranet servers. Icons 706a-b are positioned on ring 708a. Icon 706a represents "Local Network Services." Icon 706b represents "Local IP." "Local Network Services" and "Local IP" are different groupings of intranet servers.

Ring 708b is associated with VLANs. Icons 704a-b are positioned on ring 708b. Icon 704a represents the VLAN group, "VGF." Icon 704b represents the VLAN group, "VGE." "VGF" and "VGE" are different groupings of intranets.

Ring 708c is associated with network addresses. Icons 702a-b are positioned on ring 708c. Icon 702a represents "Public Non-US" addresses. Icon 702b represents "Public Network Services" addresses. "Public Non-US" and "Public Network Services" are different groupings of network addresses.

A user has selected icon 710. The selected icon 710 represents the VLAN group, "VGL." In response to the user selection, traffic associated with VLANs of the "VGL" group are presented at the GUI 700. As illustrated, connections 704 represents traffic between "VGL" and other VLAN groups, traffic between "VGL" and address groups, and traffic between "VGL" and intranet groups.

Figure 8:
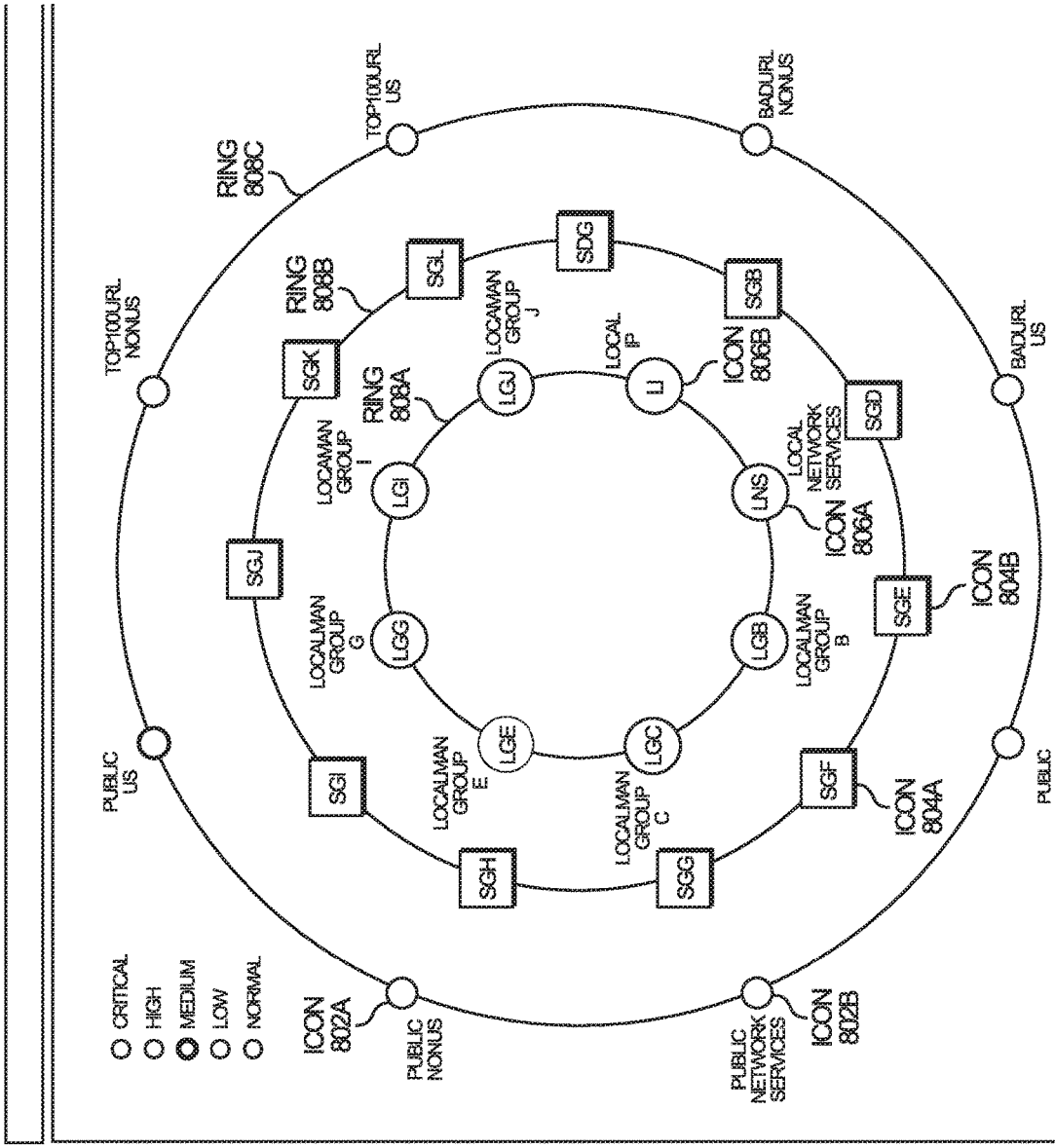
FIG. 8 illustrates an example GUI showing a constellation view for subnet groups, in accordance with one or more embodiments.

FIG. 8 illustrates an example GUI showing a constellation view for subnet groups, in accordance with one or more embodiments. GUI 800 is similar to GUI 300, except subnet groups are shown instead of device groups. As illustrated, GUI 800 shows icons representing node groups in concentric rings.

Ring 808a is associated with intranet servers. Icons 806a-b are positioned on ring 808a. Icon 806a represents "Local Network Services." Icon 806b represents "Local IP." "Local Network Services" and "Local IP" are different groupings of intranet servers.

Ring 808b is associated with subnets. Icons 804a-b are positioned on ring 808b. Icon 804a represents the subnet group, "SGF." Icon 804b represents the subnet group, "SGE." "SGF" and "SGE" are different groupings of intranets.

Ring 808c is associated with network addresses. Icons 802a-b are positioned on ring 808c. Icon 802a represents "Public Non-US" addresses. Icon 802b represents "Public Network Services" addresses. "Public Non-US" and "Public Network Services" are different groupings of network addresses.

Figure 9:
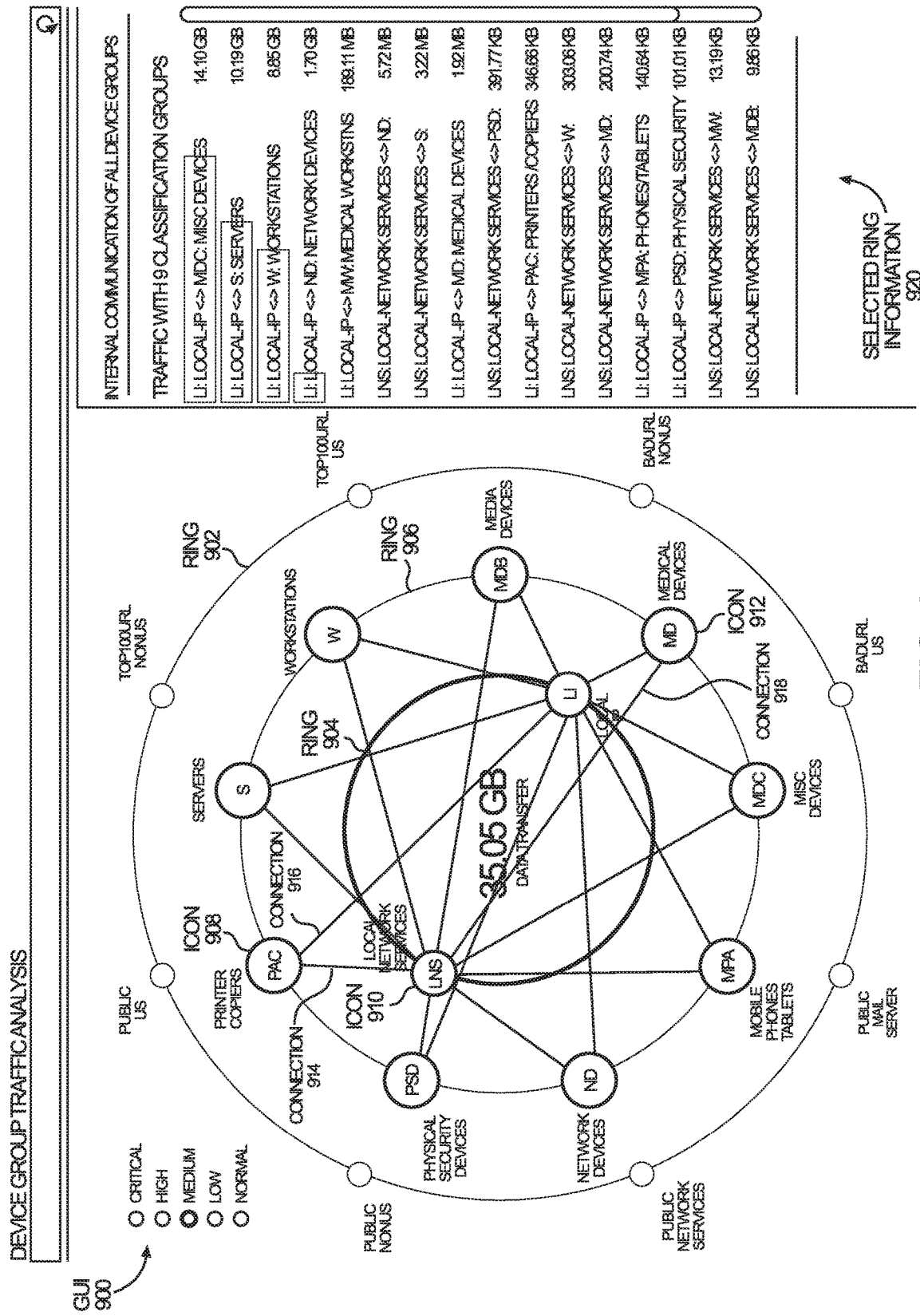
FIG. 9 illustrates an example GUI showing a constellation view for device groups, in accordance with one or more embodiments.

FIG. 9 illustrates an example GUI showing a constellation view for device groups, in accordance with one or more embodiments. As illustrated, GUI 900 shows icons representing node groups in concentric rings.

Ring 904 is associated with intranet servers. Icons positioned on ring 904 represent intranet groups. Icon 910 represents "Local Network Services."

Ring 906 is associated with devices. Icons positioned on ring 906 represent device groups. Icon 908 represents "Printer Copiers." Icon 912 represents "Medical Devices."

Ring 902 is associated with network addresses. Icons positioned on ring 902 represent address groups.

As illustrated, ring 904 is selected. Based on the user selection, communications between any intranet servers and any devices are determined. Connections representing the communications are drawn between icons of ring 904 and icons of ring 906. As an example, connection 914 connects icon 908 of ring 906 and icon 910 of ring 904. Connection 916 connects icon 908 of ring 906 and another icon of ring 904 ("Local IP" icon).

On the right panel, selected ring information 920 is displayed. Selected ring information 920 includes information associated with ring 904. Selected ring information 920 may include the number of device groups in communication with node groups of the selected ring, the amount of data being communicated between a node group of the selected ring and a device group, and/or other information.

Figure 10:
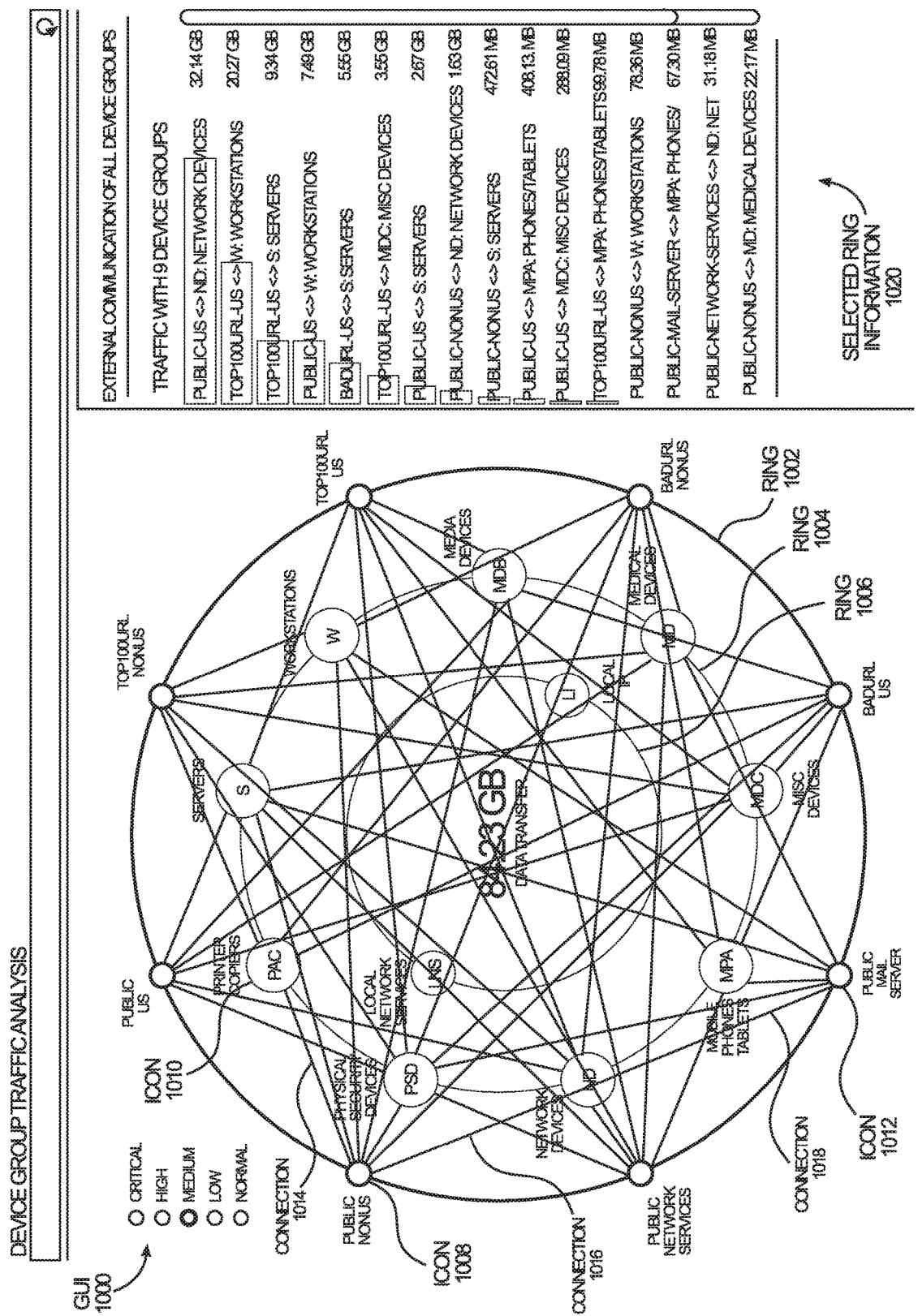
FIG. 10 illustrates an example GUI showing a constellation view for device groups, in accordance with one or more embodiments.

FIG. 10 illustrates an example GUI showing a constellation view for device groups, in accordance with one or more embodiments.

Ring 1006 is associated with intranet servers. Icons positioned on ring 1006 represent intranet groups.

Ring 1004 is associated with devices. Icons positioned on ring 1004 represent device groups. Icon 1010 represents "Printer Copiers."

Ring 1002 is associated with network addresses. Icons positioned on ring 1002 represent address groups. Icon 1008 represents "Public Non-US." Icon 1012 represents "Public Mail Server."

As illustrated, ring 1002 is selected. Based on the user selection, communications between any network addresses and any devices are determined. Connections representing the communications are drawn between icons of ring 1002 and icons of ring 1004. As an example, connections 1016 and 1018 are drawn. On the right panel, selected ring information 1020 is displayed. Selected ring information 1020 includes information associated with ring 1002.

Figure 11:
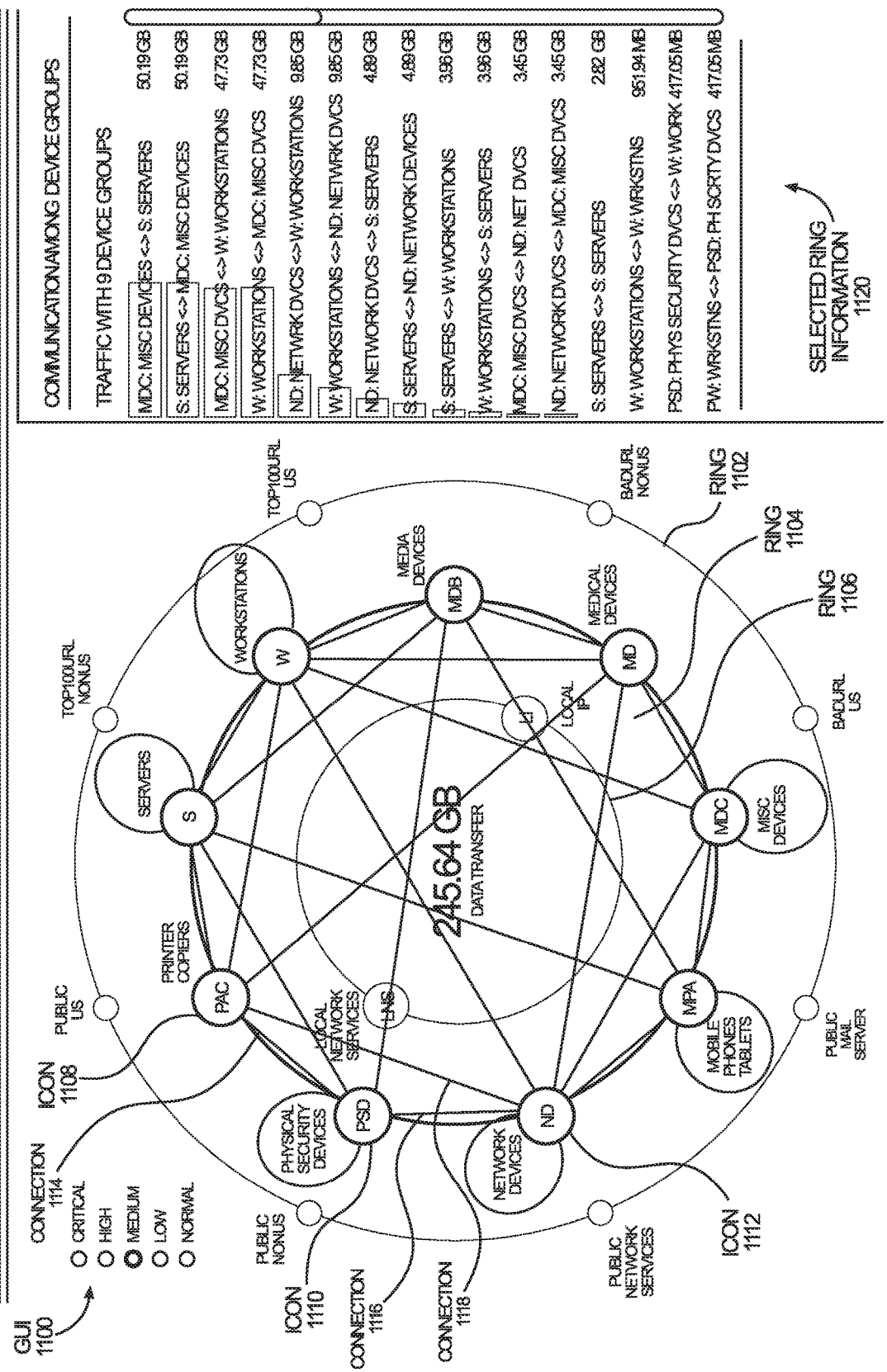
FIG. 11 illustrates an example GUI showing a constellation view for device groups, in accordance with one or more embodiments.

FIG. 11 illustrates an example GUI showing a constellation view for device groups, in accordance with one or more embodiments.

Ring 1106 is associated with intranet servers. Icons positioned on ring 1106 represent intranet groups.

Ring 1104 is associated with devices. Icons positioned on ring 1104 represent device groups. Icon 1108 represents "Printer Copiers." Icon 1110 represents "Physical Security Devices." Icon 1112 represents "Network Devices."

Ring 1102 is associated with network addresses. Icons positioned on ring 1102 represent address groups.

As illustrated, ring 1104 is selected. Based on the user selection, communications between any two devices are determined. Connections representing the communications are drawn amongst icons of ring 1104. A connection may connect two different icons of ring 1104. Additionally or alternatively, a connection may loop from one icon to itself, to indicate there is a communication between two devices of a same device group. As an example, connections 1116 and 1118 are drawn. On the right panel, selected ring information 1120 is displayed. Selected ring information 1120 includes information associated with ring 1104.

As explained above, an interface may include icons (e.g., icons 304*a*, 304*b*) corresponding to device groups, another interface may include icons (e.g., icons 704*a*, 704*b*) corresponding to VLAN groups, and another interface may include icons (e.g., icon 804*a*, icon 804*b*) corresponding to subnet groups. Each device group is associated with a group of devices of one or more device profiles. Each VLAN group is associated with a group of devices in a respective set of one or more VLANs. Each subnet group is associated with a group of devices in a respective set of one or more subnets. Hence, each interface presents traffic analysis with respect to a different grouping of devices.

An interface may present traffic analysis with respect to any grouping of devices. As an example, groupings of devices based on location may be used. One group may include devices located in California, and another group may include devices located in New York. As another example, groupings of devices based on organizational hierarchy may be used. One group may include devices managed by an Accounting Department, and another group may include devices managed by an Engineering Department. The term "custom group" may be used herein to refer to any grouping of devices, as described above. A custom group may be defined by a user and/or application.

5. Determining Attribute Values Associated with a Communication Session

Figure 12:
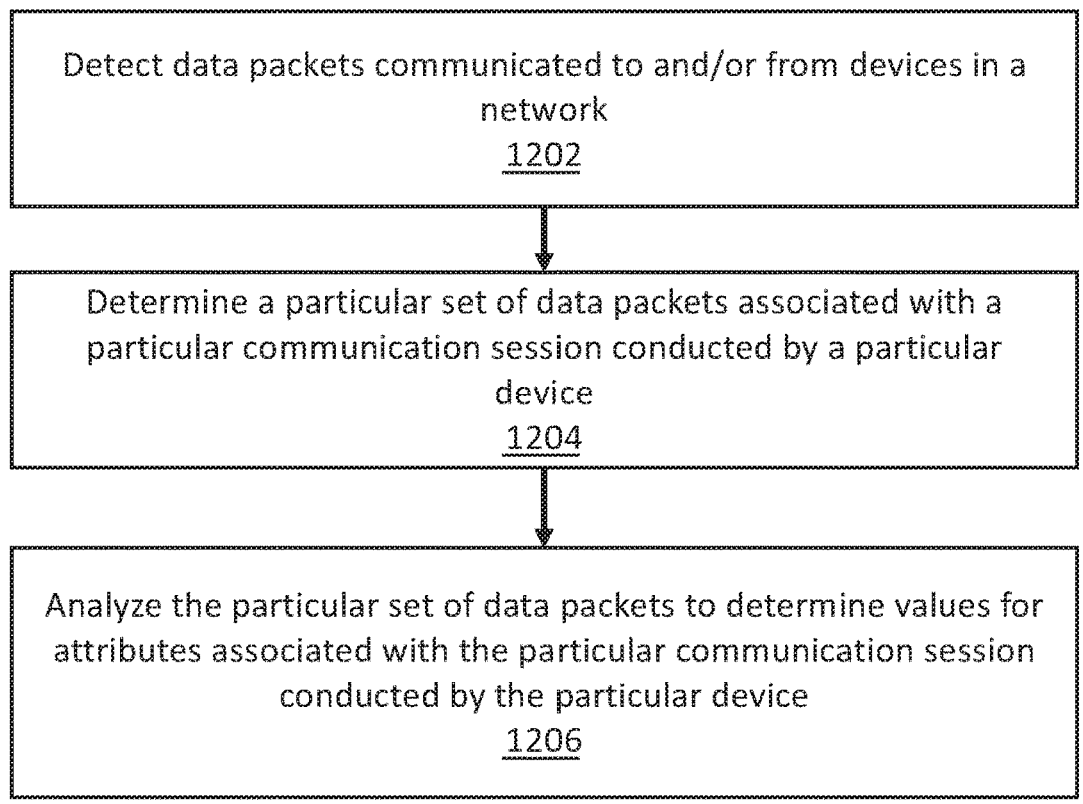
FIG. 12 illustrates an example set of operations for determining attribute values for a communication session conducted by a device in a network, in accordance with one or more embodiments.

FIG. 12 illustrates an example set of operations for determining attribute values for a communication session conducted by a device in a network, in accordance with one or more embodiments. One or more operations illustrated in FIG. 12 may be modified, rearranged, or omitted all together. Accordingly, the particular sequence of operations illustrated in FIG. 12 should not be construed as limiting the scope of one or more embodiments.

One or more embodiments include detecting data packets communicated to and/or from devices in a network (Operation 1202). One or more traffic sensors capture data packets communicated in a network, as described above in Section 2, titled "Traffic Sensors in a Network."

One or more embodiments include determining a particular set of data packets associated with a particular communication session conducted by a particular device (Operation 1204). Each data packet is analyzed to determine a communication session associated with the data packet.

In an embodiment, a communication session associated with a data packet is determined based on a session identifier (ID) included in the data packet. Additionally or alternatively, a communication session associated with a data packet is determined based on a source address and a destination address. Data packets transmitted a particular source address and a particular destination address are associated with a same communication session. Additionally or alternatively, a communication session associated with a data packet is determined based on a transmission time of the data packet. Data packets transmitted within a particular time window of each other are associated with a same communication session.

In an embodiment, a device conducting a particular communication session may be identified based on an address and/or ID of the device included in a data packet of the particular communication session. As an example, a source address included in a particular data packet may be 00:2A:10:B9:C8:74. Hence, a device associated with the address 00:2A:10:B9:C8:74 may be determined as conducting a communication session involving the particular data packet. As another example, a destination address included in a particular data packet may be 00:2A:10:B9:C8:76. Hence, a device associated with the address 00:2A:10:B9:C8:76 may be determined as conducting a communication session involving the particular data packet.

Additionally or alternatively, a device conducting a particular communication session may be identified based on a port used for communicating a data packet. A particular port used for communicating a data packet is determined. A mapping between ports and device IDs may be retrieved from a data repository. Based on the mapping, the particular port may be mapped to a particular device. The particular device may be determined as conducting the communication session.

One or more embodiments include analyzing the particular set of data packets to determine values for attributes associated with the particular communication session conducted by the particular device (Operation 1206). A particular set of data packets associated with a same communication session are analyzed to determine attribute values for the communication session. The data packets are parsed, interpreted, and/or analyzed to determine the attribute values. None, some, or all attribute values may be ascertainable based on the particular set of data packets.

As an example, an x-ray machine may communicate information to a patient database. Data packets transmitted from the x-ray machine may conform to an IPv4 protocol for routing the data packets. The data packets may also include a payload that conforms to a DICOM protocol for communicating medical information. However, the data packets may not use a CIP protocol. Hence, values for flow attributes and DICOM attributes are ascertainable. Values for CIP attributes are not ascertainable.

In an embodiment, each data packet may be parsed to identify different fields and/or components of the data packet. A header, payload, metadata, tail, and/or other component of a data packet may be analyzed.

A header may be parsed to determine attributes associated with IPv4. Based on the IPv4 specification, a field within the data packet for storing an Internet Protocol Version may be identified. A value stored in the field may be determined as the Internet Protocol Version value. The Internet Protocol Version value may be determined as an attribute value for the communication session. Similarly, based on the IPv4 specification, a field within the data packet for storing an Internet Header Length may be identified. A value stored in the field may be determined as the Internet Header Length value. The Internet Header Length value may be determined as another attribute value for the communication session.

A payload may be parsed to determine attributes associated with DICOM (and/or another application protocol). Based on a DICOM specification, a field within the data packet for storing a Consulting Physician's Name may be identified. A value stored in the field may be determined as the Consulting Physician's Name value. The Consulting Physician's Name value may be determined as another attribute value for the communication session.

In an embodiment, attribute values for a communication session include identifiers and/or addresses of the nodes conducting the communication session. An identifier of a device conducting the communication session may be identified. Additionally or alternatively, a network address that is a source and/or destination address of the communication session may be identified. Additionally or alternatively, an intranet server conducting the communication session may be identified.

6. Determining a Current Device Profile for a Device

Figure 13:
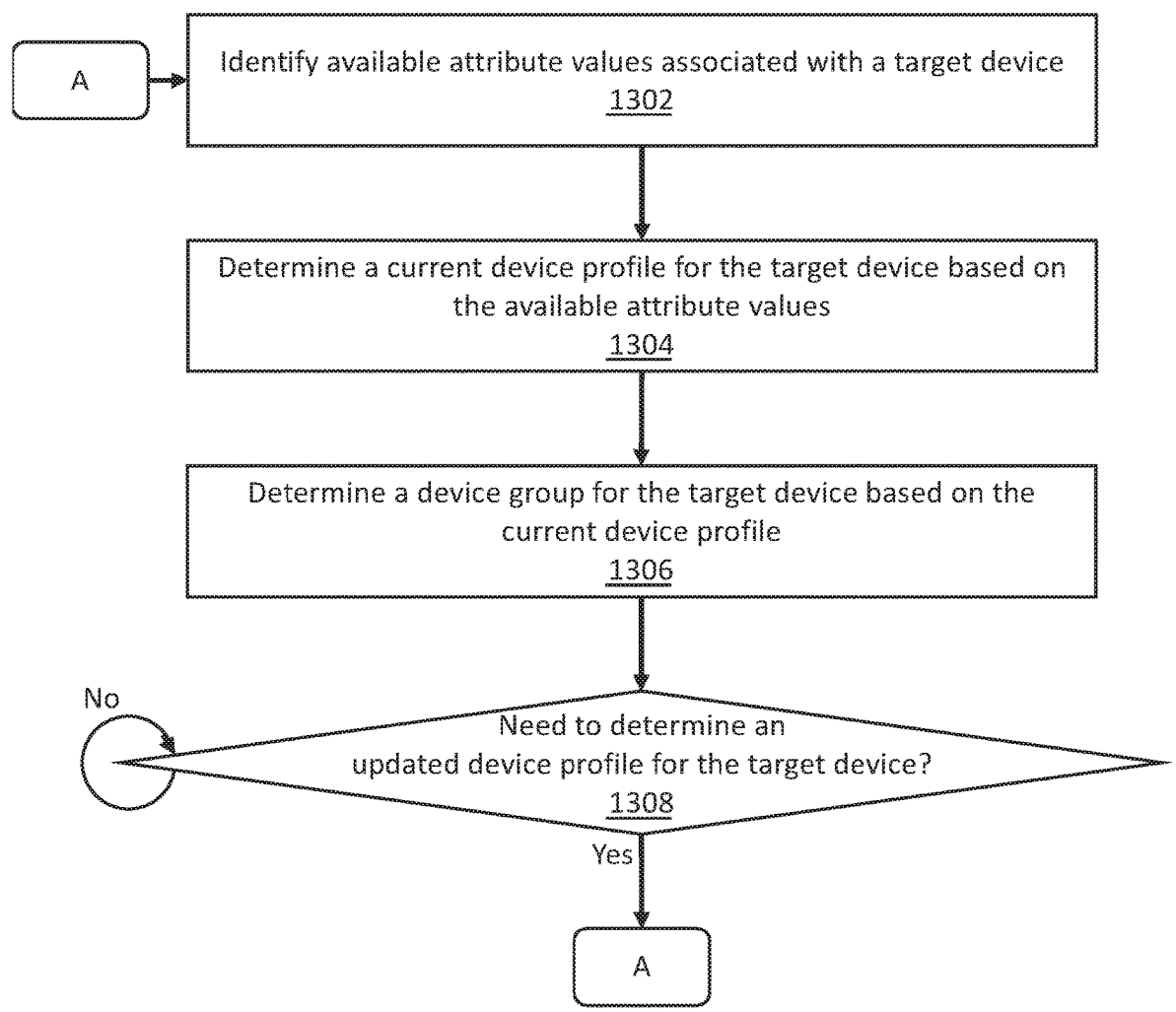
FIG. 13 illustrates an example set of operations for determining a current device profile for a device detected in a network, in accordance with one or more embodiments.

FIG. 13 illustrates an example set of operations for determining a current device profile for a device detected in a network, in accordance with one or more embodiments. One or more operations illustrated in FIG. 13 may be modified, rearranged, or omitted all together. Accordingly, the particular sequence of operations illustrated in FIG. 13 should not be construed as limiting the scope of one or more embodiments.

One or more embodiments include identifying available attribute values associated with a target device (Operation 1302). The target device is any device that is detected within a network. Attribute values associated with the target device include attribute values for one or more communication sessions conducted by the target device. Operations illustrated in FIG. 13 may be iterated with respect to each device detected in the network, in order to determine a respective current device profile for each device detected in the network.

First, each detected data packet is analyzed to determine attribute values for the communication session associated with the data packet. Examples of operations for determining attribute values for a communication session are described above with reference to FIG. 12.

Second, each data packet is analyzed to determine an identifier of a device conducting the communication session associated with the data packet. As an example, a data packet may include an identifier of a device conducting the communication session. The data packet may be parsed to extract the identifier of the device conducting the communication session. As another example, a data packet may be analyzed to determine a particular port used for communicating the data packet. A mapping between ports and device identifiers may be retrieved from a data repository. Based on the mapping, the particular port may be mapped to a particular device. The particular device may be determined as conducting the communication session.

Data packets of a set of one or more communication sessions conducted by the same target device are identified. Attribute values for the set of communication sessions are determined as attribute values associated with the target device.

In an embodiment, different data packets refer to the same target device using different identifiers (IDs). The different data packets may use different systems of device identifiers. Additionally or alternatively, the different data packets may be associated with different protocols. A mapping of device identifiers is retrieved and/or obtained from a data repository. The mapping of device identifiers indicates which IDs refer to the same device. Hence, based on the mapping of device identifiers, a set of data packets that refer to the same device are identified. As an example, a DICOM data packet may refer to Device X using the ID 1234, while a POCT data packet may refer to Device X using the ID AG941. An entry in the mapping of identifiers may indicate that both ID 1234 and ID AG941 refer to Device X. Based on the mapping, both the DICOM data packet and the POCT data packet may be determined as referring to the same Device X.

If a particular attribute value is not available for any communications sessions conducted by the target device, then the particular attribute value is determined as unavailable for the target device.

As an example, Data Packet A and Data Packet B are included in Communication Session X, which is conducted by Device V. Data Packet C and Data Packet D are included in Communication Session Y, which is also conducted by Device V. Values for DICOM attributes may be ascertainable and determined based on Data Packet A and Data Packet B. Values for DHCP attributes may be ascertainable and determined based on Data Packet C and Data Packet D. Since both Communication Session X and Communication Session Y are conducted by Device V, available attribute values associated with Device V include the values for the DICOM attributes and the values for the DHCP attributes. However, values for DNS attributes might be unascertainable based on any communication sessions conducted by Device V. Therefore, unavailable attribute values associated with Device V include values for DNS attributes.

One or more embodiments include determining a current device profile for the target device based on the available attribute values (Operation 1304). A classification algorithm is applied to the available attribute values. Examples of classification algorithms are described in the related U.S. patent application Ser. No. 16/117,897, filed Aug. 30, 2018, and U.S. patent application Ser. No. 16/118,334, filed Aug. 30, 2018. Additional and/or alternative classification algorithms may be used. The classification algorithm outputs a current device profile for the target device.

One or more embodiments include determining a device group for the target device based on the current device profile (Operation 1306). In an embodiment, each device profile is associated with a device group. As an example, a device profile of "X-Ray Machines" may be associated with the device group of "Medical Devices." A device profile of "Blood Pressure Monitor" may be associated with the device group of "Medical Devices." Hence, a device group for the target device is determined directly based on the current device profile. In another embodiment, a data repository stores a set of mappings between device profiles and device groups. The data repository stores the set of mappings separate from the device profiles. The system performs a look up operation of the set of mappings using the current device profile for the target device. The system determines a device group that is mapped to the current device profile.

One or more embodiments include determining whether there is a need to determine an updated device profile for the target device (Operation 1308). An updated device profile for the target device may be determined on a periodic basis, such as once per day, or once per week. An updated device profile may hence be needed at the scheduled time. Additionally or alternatively, an updated device profile for the target device may be determined based on a triggering event. The triggering event may be, for example, the detection of additional available attribute values associated with the target device.

Figure 14A:
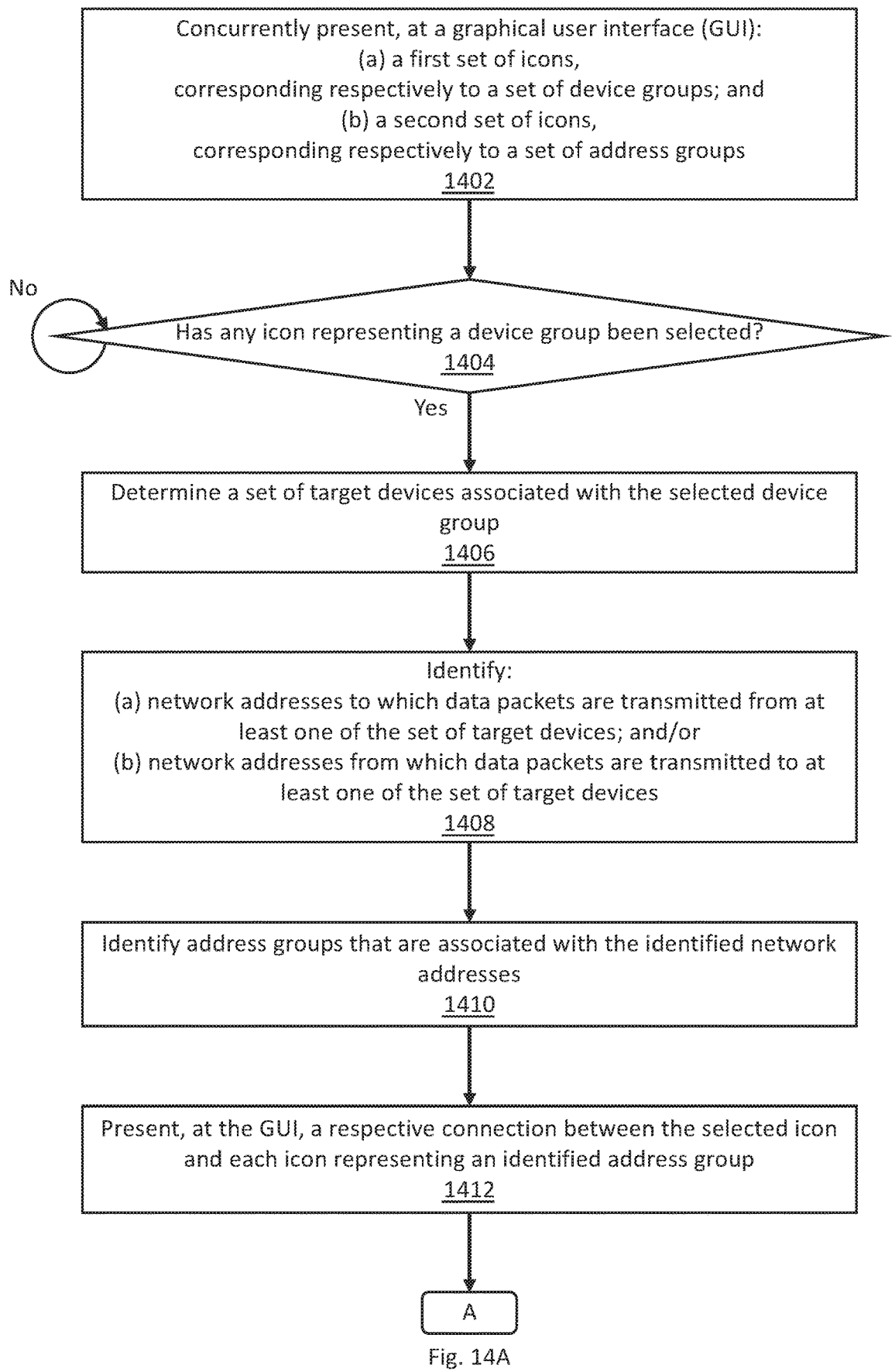
FIGS. 14A-B illustrate an example set of operations for presenting, at a GUI, a constellation view for device groups, in accordance with one or more embodiments.
Figure 14B:
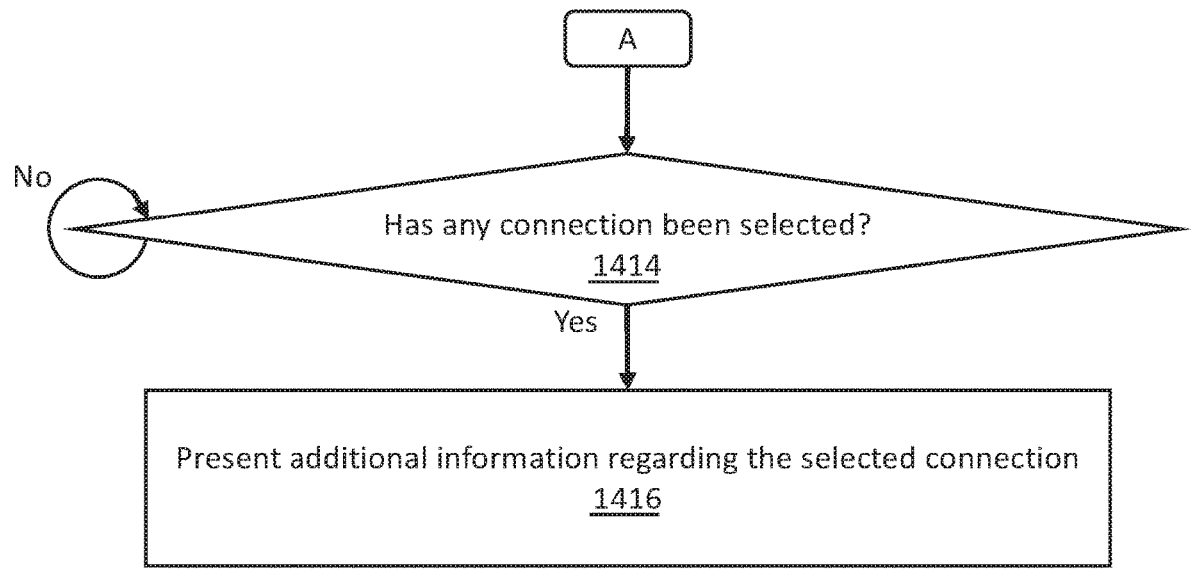

7. Presenting, at a GUI, a Constellation View of Communications Associated with Node Groups FIGS. 14A-B illustrate an example set of operations for presenting, at a GUI, a constellation view for device groups, in accordance with one or more embodiments. One or more operations illustrated in FIGS. 14A-B may be modified, rearranged, or omitted all together. Accordingly, the particular sequence of operations illustrated in FIGS. 14A-B should not be construed as limiting the scope of one or more embodiments.

One or more embodiments include concurrently presenting, at a graphical user interface (GUI) (a) a first set of icons, corresponding respectively to a set of device groups (spec: ring, etc.); and (b) a second set of icons, corresponding respectively to a set of address groups (Operation 1402). A constellation view engine causes presentation, at a GUI, of icons representing device groups and icons representing address groups. The icons representing device groups are arranged on one ring. The icons representing address groups are arranged in another ring. The two rings share a common center.

One or more embodiments include determining whether any icon representing a device group has been selected (Operation 1404). A user selects, via the GUI, a particular icon representing a particular device group. As an example, a user may use a mouse to click on an icon. The constellation view engine receives the user selection.

One or more embodiments include determining a set of target devices associated with the selected device group (Operation 1406). The constellation view engine determines one or more target devices associated with the particular device group of the selected icon. Examples of operations for determining a device group for a device are described above with reference to Operation 1306 of FIG. 13. The operations of FIG. 13 may be iterated with respect to each device detected in a network to determine a device group for each device. Hence, devices associated with the selected device group are identified.

One or more embodiments include identifying (a) network addresses to which data packets are transmitted from at least one of the set of target devices; and/or (b) network addresses from which data packets are transmitted to at least one of the set of target devices (Operation 1408). The constellation view engine identifies communication sessions involving one or more of the target devices. Examples of operations for determining attribute values for a communication session are described above with reference to Operation 1206 of FIG. 12. Attribute values for a communication session include identifiers of the nodes conducting the communication session. Hence, communication sessions involving one or more of the target devices are identified. A target device may serve as a source and/or destination of an identified communication session.

The constellation view engine determines network addresses associated with each of the identified communication sessions. As described above, attribute values for a communication session include identifiers of the nodes conducting the communication session. One node of an identified communication session is a target device. Another node of the identified communication session is a network address to which data packets are transmitted from the target device and/or from which data packets are transmitted to the target device.

As an example, in a particular communication session, a target device may transmit a particular request to a network address of 12345. A constellation view engine may identify the particular communication session as involving the target device. The constellation view engine may determine that a network address associated with the particular communication session is 12345.

As another example, in a particular communication session, a target device may receive a particular data set from a network address of 67890. A constellation view engine may identify the particular communication session as involving the target device. The constellation view engine may determine that a network address associated with the particular communication session is 67890.

One or more embodiments include identifying address groups that are associated with the identified network addresses (Operation 1410). A data repository stores a set of mappings between network addresses and address groups. The constellation view engine performs a look up operation on the set of mappings based on the network addresses identified at Operation 1408. An address group of each identified network address is determined.

One or more embodiments include presenting, at the GUI, a respective connection between the selected icon and each icon representing an identified address group (Operation 1412). The constellation view engine causes presentation of a respective connection between the selected icon and each icon representing an address group identified at Operation 1410. Hence, there may be multiple lines stemming from the selected icon, each line connecting to an icon representing an identified address group. A user may easily view the types of network addresses with which the selected icon communicates.

In one or more embodiments, other icons may be selected. In an embodiment, an icon representing an address group is selected. A set of target network addresses associated with the selected address group is determined. Devices to which data packets are transmitted from at least one of the set of target network addresses are identified. Additionally or alternatively, devices from which data packets are transmitted to at least one of the set of target network addresses are identified. Device groups associated with the identified devices are further identified. Connections between the selected icon representing the address group and each icon representing an identified device group are presented at the GUI.

In one or more embodiments, the GUI presents icons on three or more concentric rings. Each ring may correspond to one of: device groups, address groups, intranet groups, VLAN groups, and/or subnet groups. As an example, a user may select an icon representing a device group. Communications between devices of the selected device group and network addresses are identified, as described above with reference to Operation 1408. Address groups including network addresses that have communications with the devices of the selected device group are identified, as described above with reference to Operation 1410. Additionally, communications between devices of the selected device group and intranet servers are identified. Intranet groups including intranet servers that have communications with the devices of the selected device group are identified.

Connections are drawn between the selected icon and each icon representing an identified address group. Additionally, connections are drawn between the selected icon and each icon representing an identified intranet group. Based on a constellation view to show communications between device groups, address groups, and intranet servers, complex outbound communications (with network addresses) and inbound communications (with intranet servers) are presented in a simple and clear fashion. A user may easily understand the communications conducted by the selected device group. A user may easily focus analysis on communications with certain node groups.

In one or more embodiments, a visualization associated with a connection representing communications between two node groups may indicate an attribute associated with the communications. Additionally or alternatively, a visualization associated with an icon representing a node group may indicate an attribute associated with the node group.

As an example, a thickness of a line drawn between two icons may indicate a traffic level (such as, an amount of data, a number of data packets, and/or a number of communication sessions) between the nodes representing by the two icons.

As an example, a color of a line drawn between two icons may indicate a risk level associated with communications between the nodes represented by the two icons. A system may determine a device profile of a particular device. The device profile indicates the expected attribute values of the particular device. The system may determine that a communication session, between the particular device and a particular network address, is associated with attribute values that are different than the expected attribute values. The system may determine that the communication session is associated with a high risk level. The system may present, at a GUI, a connection between an icon representing a device group including the particular device and an icon representing an address group including the particular network address. The connection may be presented in red to indicate that the communications is associated with a high risk level. Other connections may be presented in green to indicate that other communications are associated with a normal risk level. Examples of operations for determining anomalous behavior of a device are described in the related U.S. patent application Ser. No. 16/118,334, filed Aug. 30, 2018, which is hereby incorporated by reference.

One or more embodiments include determining whether any connection has been selected (Operation 1414). A connection presented at the GUI, at Operation 1412, is selectable to request additional information about the connection. A user selects, via the GUI, a particular connection presented at the GUI. As an example, a user may use a mouse to click on a connection. The constellation view engine receives the user selection.

One or more embodiments include presenting additional information regarding the selected connection (Operation 1416). The constellation view engine presents additional information regarding the selected connection. The additional information may be presented concurrently with the constellation view. The additional information may, for example, appear above the constellation view.

The additional information regarding the selected connection may include a traffic level associated with the selected connection. The system identifies communications between the node groups represented by the selected connection. The system determines an amount of data, number of data packets, and/or number of communication sessions associated with the communications between the node groups. The system presents, at the GUI, information indicating the amount of data, number of data packets, and/or number of communication sessions.

The additional information regarding the selected connection may include a device profile associated with a device that conducts communications represented by the selected connection. The system identifies a device group represented by an icon connected by the connection. The system identifies a device within the device group. The system determines a device profile of the device, as described above with reference to FIG. 13. The system presents, at the GUI, information associated with the device profile, such as the name of the device profile, a device photo associated with the device profile, and/or expected attribute values of the device profile. Additionally or alternatively, the system presents, at the GUI, other information about the device, such as a warranty on the device, and a maintenance schedule recommended, or otherwise determined, for the device.

The additional information regarding the selected connection may include a Sankey diagram indicating traffic flows represented by the selected connection. An example Sankey diagram is described above with reference to FIG. 5. The system may determine node groups represented by icons connected by the selected connection, such as a device group and an address group. The system determines device profiles, within the device group, that conduct communications with any network addresses in the address group. The system determines device identifiers of target devices associated with device profiles that conduct the communications. The system determines (a) network addresses, associated with the address group, from which communications are transmitted to at least one target device, and (b) network addresses, associated with the address group, to which communications are transmitted from at least one target device. The system draws a line connecting a device identifier of a particular device, a device profile, the address group, and a particular network address. The line represents a traffic flow between the particular device and the particular network address. The thickness of the line represents a traffic level associated with the traffic flow.

The additional information regarding the selected connection may include a geographical map indicating a geographical location associated with network addresses conducting communications represented by the selected connection. The system determines an address group associated with communications represented by the selected connection. The system determines network addresses, associated with the address group, that are involved in the communications. The system determines a geographical location associated with each network address. The geographical location may be determined based on a registry and/or database, such as American Registry of Internet Numbers (ARIN). The system presents a geographical map, with pin and/or flags indicating the geographical locations associated with the network addresses.

The additional information regarding the selected connection may include a risk level associated with the selected connection. Examples of operations for determining a risk level associated with a connection are described above with reference to Operation 1412. The system may present the risk level information of a particular connection in response to a user selection of the particular connection. The risk level information may be presented using text and/or visualizations.

In one or more embodiments, each ring displayed on the GUI is selectable to request information associated with communications between the node groups of the selected ring and node groups of another ring. As an example, each ring may be selectable to request information associated with communications between the node groups of the selected ring and device groups.

In response to a user selection of a ring associated with address groups, communications between each network address and each device is determined. A connection is drawn between an address group and a device group, if the address group includes at least one network address that has communications with at least one device of the device group.

In response to a user selection of a ring associated with intranet groups, communications between each intranet server and each device is determined. A connection is drawn between an intranet group and a device group, if the intranet group includes at least one intranet server that has communications with at least one device of the device group.

In response to a user selection of a ring associated with device groups, communications between devices are determined. A connection is drawn between two device groups, if one device group includes at least one device that has communications with at least one other device of the other device group. Additionally or alternatively, a connection is drawn from one device group to itself, if the device group includes two devices that communicate with each other.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 15:
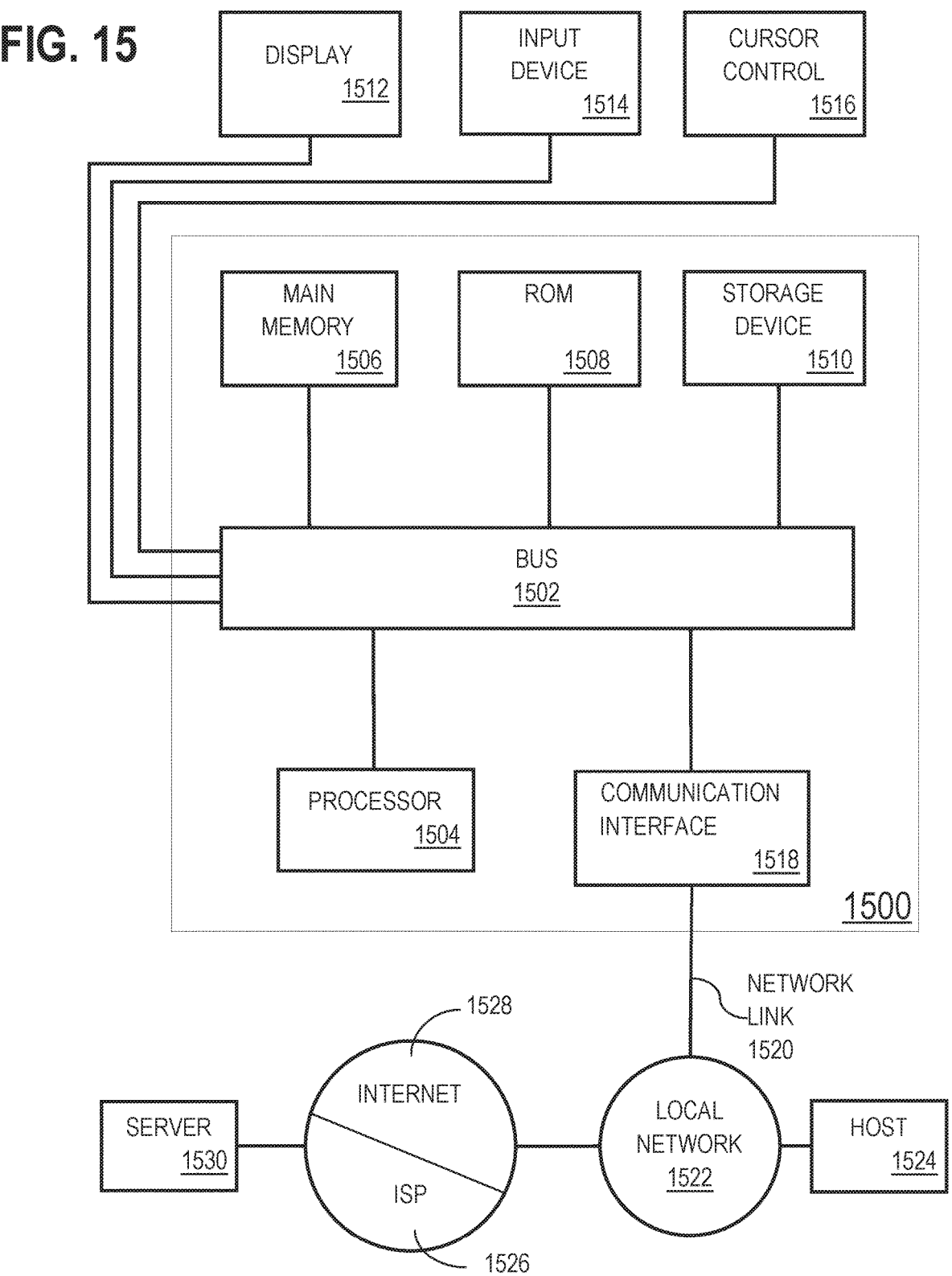
FIG. 15 shows a block diagram that illustrates a computer system in accordance with one or more embodiments.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:

concurrently presenting, at a graphical user interface (GUI):
(a) a first set of icons, corresponding respectively to a set of custom groups, arranged on a first ring;
(b) a second set of icons, corresponding respectively to a set of address groups, arranged on a second ring;
wherein a first custom group, of the set of custom groups, is associated with a first set of devices;
wherein the first ring and the second ring share a same center;

receiving a first user selection of a first icon corresponding to the first custom group;

responsive to the first user selection:

determining a particular set of network addresses associated with the first set of devices, wherein the particular set of network addresses comprises at least one of:
(a) network addresses to which data packets are transmitted from at least a first device of the first set of devices;
(b) network addresses from which data packets are transmitted to at least a second device of the first set of devices;

determining a first subset of the set of address groups that is associated with the particular set of network addresses, and a second subset of the set of address groups that is not associated with the particular set of network addresses;

presenting, at the GUI, a respective connection between the first icon and each of a first subset of the second set of icons corresponding to the first subset of the set of address groups, without presenting any connection between the first icon and each of a second subset of the second set of icons corresponding to the second subset of the set of address groups.

2. The one or more media of claim 1, further storing instructions which, when executed by one or more processors, cause:

presenting, at the GUI, a first interface element associated with a first connection between the first icon and a second icon of the first subset of the second set of icons, wherein the first interface element indicates a first attribute of the first connection; and presenting, at the GUI, a second interface element associated with a second connection between the first icon and a third icon of the first subset of the second set of icons, wherein the second interface element indicates a second attribute of the second connection;

wherein the first interface element and the second interface element are different.

3. The medium of claim 1, wherein:
a particular connection between the first icon and an icon of the first subset of the second set of icons is selectable to request additional information associated with the particular connection.

4. The medium of claim 3, wherein the additional information comprises at least one of:
at least one of the particular set of network addresses;
a volume of traffic communicated through the particular connection;
a device profile associated with a third device of the first set of devices that communicated with at least one of the particular set of network addresses;
a risk level associated with the third device;
a risk level associated with the particular connection;
a Sankey diagram indicating traffic flows between the first set of devices and the particular set of network addresses;
a map indicating a geographical location associated with at least one of the particular set of network addresses.

5. The one or more media of claim 1, further storing instructions which, when executed by one or more processors, cause:
receiving a second user selection of a particular connection between the first icon and an icon of the first subset of the second set of icons;
responsive to the second user selection:
presenting, at the GUI, additional information associated with the particular connection.

6. The medium of claim 5, wherein the first icon, the second icon, the particular connection, and the additional information are concurrently presented at the GUI.

7. The one or more media of claim 1, further storing instructions which, when executed by one or more processors, cause:
receiving a second user selection of a second icon of the second set of icons, wherein the second icon corresponds to a first address group of the set of address groups;
responsive to the second user selection:
determining a particular set of devices associated with a first set of addresses associated with the first address group, wherein the particular set of devices comprises at least one of:
(a) devices to which data packets are transmitted from at least a first address of the first set of addresses;
(b) devices from which data packets are transmitted to at least a second address of the first set of addresses;
determining a first subset of the set of custom groups that is associated with the particular set of devices, and a second subset of the set of custom groups that is not associated with the particular set of devices;
presenting, at the GUI, a respective connection between the second icon and each of a first subset of the first set of icons corresponding to the first subset of the set of custom groups, without presenting any connection between the second icon and each of a second subset of the first set of icons corresponding to the second subset of the set of custom groups.

8. The one or more media of claim 1, further storing instructions which, when executed by one or more processors, cause:
presenting, at the GUI, a third set of icons, corresponding respectively to a set of intranet groups, arranged on a third ring;
wherein the first ring, the second ring, and the third ring, share a same center;
responsive to the first user selection:
determining a particular set of intranet servers associated with the first set of devices, wherein the particular set of intranet servers comprises at least one of:
(a) intranet servers to which data packets are transmitted from at least one of the first set of devices;
(b) intranet servers from which data packets are transmitted to at least one of the first set of devices;
determining a first subset of the set of intranet groups that is associated with the particular set of intranet servers, and a second subset of the set of intranet groups that is not associated with the particular set of intranet servers;
presenting, at the GUI, a respective connection between the first icon and each of a first subset of the third set of icons corresponding to the first subset of the set of intranet groups, without presenting any connection between the first icon and each of the second subset of the third set of icons corresponding to the second subset of the set of intranet groups.

9. The medium of claim 8, wherein the set of intranet groups comprises one or more of:
a Dynamic Host Configuration Protocol (DHCP) server;
a Lightweight Directory Access Protocol (LDAP) server; and
a mail server.

10. The medium of claim 1, wherein the set of custom groups comprises at least one of:
a set of device groups;
a set of virtual local area network (VLAN) groups; and
a set of subnet groups.

11. A system, comprising:
at least one device including a hardware processor; and
the system being configured to perform operations comprising:
concurrently presenting, at a graphical user interface (GUI):
(a) a first set of icons, corresponding respectively to a set of custom groups, arranged on a first ring;
(b) a second set of icons, corresponding respectively to a set of address groups, arranged on a second ring;
wherein a first custom group, of the set of custom groups, is associated with a first set of devices;
wherein the first ring and the second ring share a same center;
receiving a first user selection of a first icon corresponding to the first custom group;
responsive to the first user selection:
determining a particular set of network addresses associated with the first set of devices, wherein the particular set of network addresses comprises at least one of:
(a) network addresses to which data packets are transmitted from at least a first device of the first set of devices;
(b) network addresses from which data packets are transmitted to at least a second device of the first set of devices;
determining a first subset of the set of address groups that is associated with the particular set of network addresses, and a second subset of the set of address groups that is not associated with the particular set of network addresses;
presenting, at the GUI, a respective connection between the first icon and each of a first subset of the second set of icons corresponding to the first subset of the set of address groups, without presenting any connection between the first icon and each of a second subset of the second set of icons corresponding to the second subset of the set of address groups.

12. The system of claim 11, wherein the operations further comprise:
presenting, at the GUI, a first interface element associated with a first connection between the first icon and a second icon of the first subset of the second set of icons, wherein the first interface element indicates a first attribute of the first connection; and
presenting, at the GUI, a second interface element associated with a second connection between the first icon and a third icon of the first subset of the second set of icons, wherein the second interface element indicates a second attribute of the second connection;
wherein the first interface element and the second interface element are different.

13. The system of claim 11, wherein:
a particular connection between the first icon and an icon of the first subset of the second set of icons is selectable to request additional information associated with the particular connection.

14. The system of claim 13, wherein the additional information comprises at least one of:
at least one of the particular set of network addresses;
a volume of traffic communicated through the particular connection;
a device profile associated with a third device of the first set of devices that communicated with at least one of the particular set of network addresses;
a risk level associated with the third device;
a risk level associated with the particular connection;
a Sankey diagram indicating traffic flows between the first set of devices and the particular set of network addresses;
a map indicating a geographical location associated with at least one of the particular set of network addresses.

15. The system of claim 11, wherein the operations further comprise:
receiving a second user selection of a particular connection between the first icon and an icon of the first subset of the second set of icons;
responsive to the second user selection:
presenting, at the GUI, additional information associated with the particular connection.

16. The system of claim 15, wherein the first icon, the second icon, the particular connection, and the additional information are concurrently presented at the GUI.

17. The system of claim 11, wherein the operations further comprise:
receiving a second user selection of a second icon of the second set of icons, wherein the second icon corresponds to a first address group of the set of address groups;
responsive to the second user selection:
determining a particular set of devices associated with a first set of addresses associated with the first address group, wherein the particular set of devices comprises at least one of:
(a) devices to which data packets are transmitted from at least a first address of the first set of addresses;
(b) devices from which data packets are transmitted to at least a second address of the first set of addresses;
determining a first subset of the set of custom groups that is associated with the particular set of devices, and a second subset of the set of custom groups that is not associated with the particular set of devices;
presenting, at the GUI, a respective connection between the second icon and each of a first subset of the first set of icons corresponding to the first subset of the set of custom groups, without presenting any connection between the second icon and each of a second subset of the first set of icons corresponding to the second subset of the set of custom groups.

18. The medium of claim 11, wherein the operations further comprise:
presenting, at the GUI, a third set of icons, corresponding respectively to a set of intranet groups, arranged on a third ring;
wherein the first ring, the second ring, and the third ring, share a same center;
responsive to the first user selection:
determining a particular set of intranet servers associated with the first set of devices, wherein the particular set of intranet servers comprises at least one of:
(a) intranet servers to which data packets are transmitted from at least one of the first set of devices;
(b) intranet servers from which data packets are transmitted to at least one of the first set of devices;
determining a first subset of the set of intranet groups that is associated with the particular set of intranet servers, and a second subset of the set of intranet groups that is not associated with the particular set of intranet servers;
presenting, at the GUI, a respective connection between the first icon and each of a first subset of the third set of icons corresponding to the first subset of the set of intranet groups, without presenting any connection between the first icon and each of the second subset of the third set of icons corresponding to the second subset of the set of intranet groups.

19. A method comprising:
concurrently presenting, at a graphical user interface (GUI):
(a) a first set of icons, corresponding respectively to a set of custom groups, arranged on a first ring;
(b) a second set of icons, corresponding respectively to a set of address groups, arranged on a second ring;
wherein a first custom group, of the set of custom groups, is associated with a first set of devices;
wherein the first ring and the second ring share a same center;
receiving a first user selection of a first icon corresponding to the first custom group;
responsive to the first user selection:
determining a particular set of network addresses associated with the first set of devices, wherein the particular set of network addresses comprises at least one of:
(a) network addresses to which data packets are transmitted from at least a first device of the first set of devices;
(b) network addresses from which data packets are transmitted to at least a second device of the first set of devices;
determining a first subset of the set of address groups that is associated with the particular set of network addresses, and a second subset of the set of address groups that is not associated with the particular set of network addresses;
presenting, at the GUI, a respective connection between the first icon and each of a first subset of the second set of icons corresponding to the first subset of the set of address groups, without presenting any connection between the first icon and each of a second subset of the second set of icons corresponding to the second subset of the set of address groups;

wherein the method is performed by at least one device including a hardware processor.

20. The method of claim 19, further comprising:

presenting, at the GUI, a first interface element associated with a first connection between the first icon and a second icon of the first subset of the second set of icons, wherein the first interface element indicates a first attribute of the first connection; and presenting, at the GUI, a second interface element associated with a second connection between the first icon and a third icon of the first subset of the second set of icons, wherein the second interface element indicates a second attribute of the second connection;

wherein the first interface element and the second interface element are different.

\* \* \* \* \*